US011842127B2

(12) United States Patent
AlQahtani et al.

(10) Patent No.: US 11,842,127 B2
(45) Date of Patent: Dec. 12, 2023

(54) MODELING FRACTURED WELLS

(71) Applicant: Saudi Arabian Oil Company, Dhahran (SA)

(72) Inventors: Ghazi Dhafer AlQahtani, Dhahran (SA); Zhen Chen, Dhahran (SA); Abdullah A. Hamidi, Dhahran (SA); Tareq Shaalan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 318 days.

(21) Appl. No.: 17/179,101

(22) Filed: Feb. 18, 2021

(65) Prior Publication Data

US 2022/0261513 A1    Aug. 18, 2022

(51) Int. Cl.
*G06F 30/20* (2020.01)
*E21B 41/00* (2006.01)
*E21B 43/26* (2006.01)
*E21B 47/08* (2012.01)
*G06F 111/10* (2020.01)

(52) U.S. Cl.
CPC .......... *G06F 30/20* (2020.01); *E21B 41/0035* (2013.01); *E21B 43/26* (2013.01); *E21B 47/08* (2013.01); *E21B 2200/20* (2020.05); *G06F 2111/10* (2020.01)

(58) Field of Classification Search
CPC .. G06F 30/20; G06F 2111/10; E21B 41/0035; E21B 43/26; E21B 47/08; E21B 2200/20; E21B 41/00
See application file for complete search history.

(56) References Cited

U.S. PATENT DOCUMENTS

| 9,390,204 | B2* | 7/2016 | Bowen | G06F 30/20 |
| 2010/0250216 | A1* | 9/2010 | Narr | E21B 49/00 703/10 |
| 2011/0029293 | A1 | 2/2011 | Petty et al. | |
| 2013/0073268 | A1 | 3/2013 | Abacioglu et al. | |
| 2014/0151035 | A1 | 6/2014 | Cohen et al. | |
| 2016/0090823 | A1* | 3/2016 | Alzahabi | E21B 43/30 703/2 |
| 2016/0326859 | A1* | 11/2016 | Crews | E21B 41/0035 |
| 2016/0357883 | A1* | 12/2016 | Weng | E21B 43/267 |

(Continued)

OTHER PUBLICATIONS

Edwards, D.A., Cheng, N., Dombrowsky, T.P., Bowen, G. and Nasvik, H., Feb. 2013, Representing hydraulic fractures using a multilateral, multisegment well in simulation models. In SPE Reservoir Simulation Symposium. OnePetro. 13 Pages. (Year: 2013).*

(Continued)

*Primary Examiner* — Eunhee Kim
(74) *Attorney, Agent, or Firm* — Fish & Richardson P.C.

(57) ABSTRACT

Disclosed are methods, systems, and computer-readable medium to perform operations including: receiving, by a computing device, parameters of the fractured well, wherein the fractured well comprises a wellbore and one or more hydraulic fractures extending from the wellbore; generating, by the computing device and based on the parameters of the fractured well, an equivalent complex well that represents the fractured well; and executing, by the computing device and using the equivalent complex well, a simulation that simulates the performance of the fractured well.

17 Claims, 16 Drawing Sheets

(56) References Cited

U.S. PATENT DOCUMENTS

| | | | |
|---|---|---|---|
| 2017/0247995 A1* | 8/2017 | Crews | G01V 1/288 |
| 2018/0232950 A1* | 8/2018 | Brewer | G06F 17/175 |
| 2018/0290188 A1* | 10/2018 | Crichlow | B09B 1/008 |
| 2019/0292884 A1 | 9/2019 | Mcclure | |
| 2022/0120173 A1* | 4/2022 | Balan | E21B 47/135 |

OTHER PUBLICATIONS

Akuanyionwu et al., "Examination of Hydraulic Fracture Production Modeling Techniques," presented at the SPE International Production and Operations Conference and Exhibition, Doha, Qatar, 2012, 13 pages.

Al-Mutairi et al., "Prediction of Multistage Fracturing Performance in Horizontal Heavy Oil Carbonate Reservoir," presented at the SPE Kuwait Oil & Gas Show and Conference, Mishref, Kuwait, Oct. 11-14, 2015, 20 pages.

AlQahtani et al., "High Definition Modeling for Complex Multilateral Well with Smart Completions," presented at the International Petroleum Technology Conference, Dhahran, Saudi Arabia, Jan. 13-15, 2020, 16 pages.

Al-Shaalan et al., "Parallel Computation for Complex Wells Modeling in Full-Field Reservoir Simulation," presented at the SPE Reservoir Simulation Conference, Montgomery, TX, USA, Feb. 20-22, 2017, 11 pages.

Chen et al., "Acceleration Pressure Induced from Wellbore Inflow and its Influence on Productivity," presented SPE/IATMI Asia Pacific Oil & Gas Conference and Exhibition, Bali, Indonesia, Oct. 29- 31, 2019, 17 pages.

PCT International Search Report and Written Opinion in International Appln. No. PCT/US2022/016772, dated May 11, 2022, 13 pages.

* cited by examiner

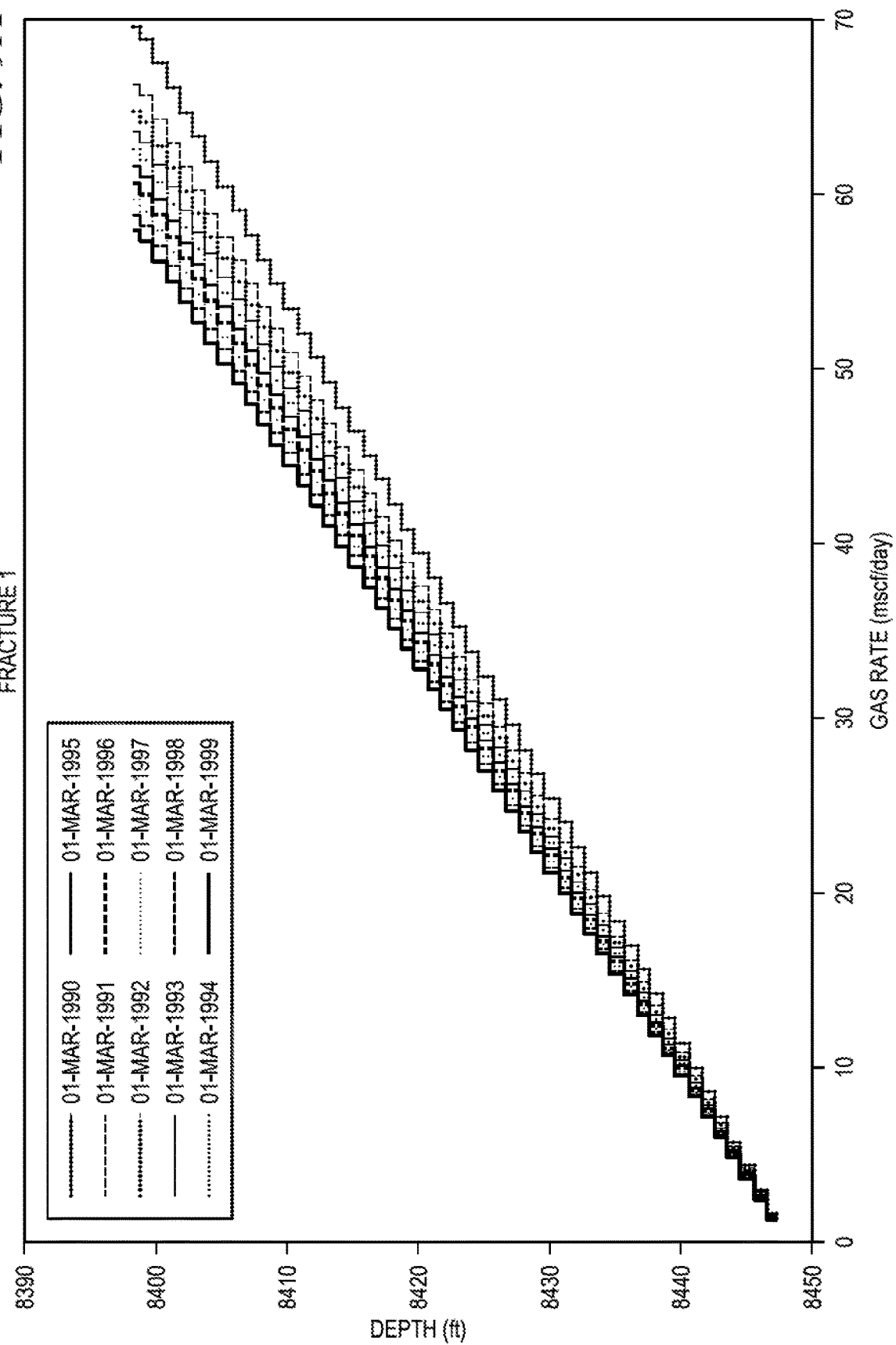

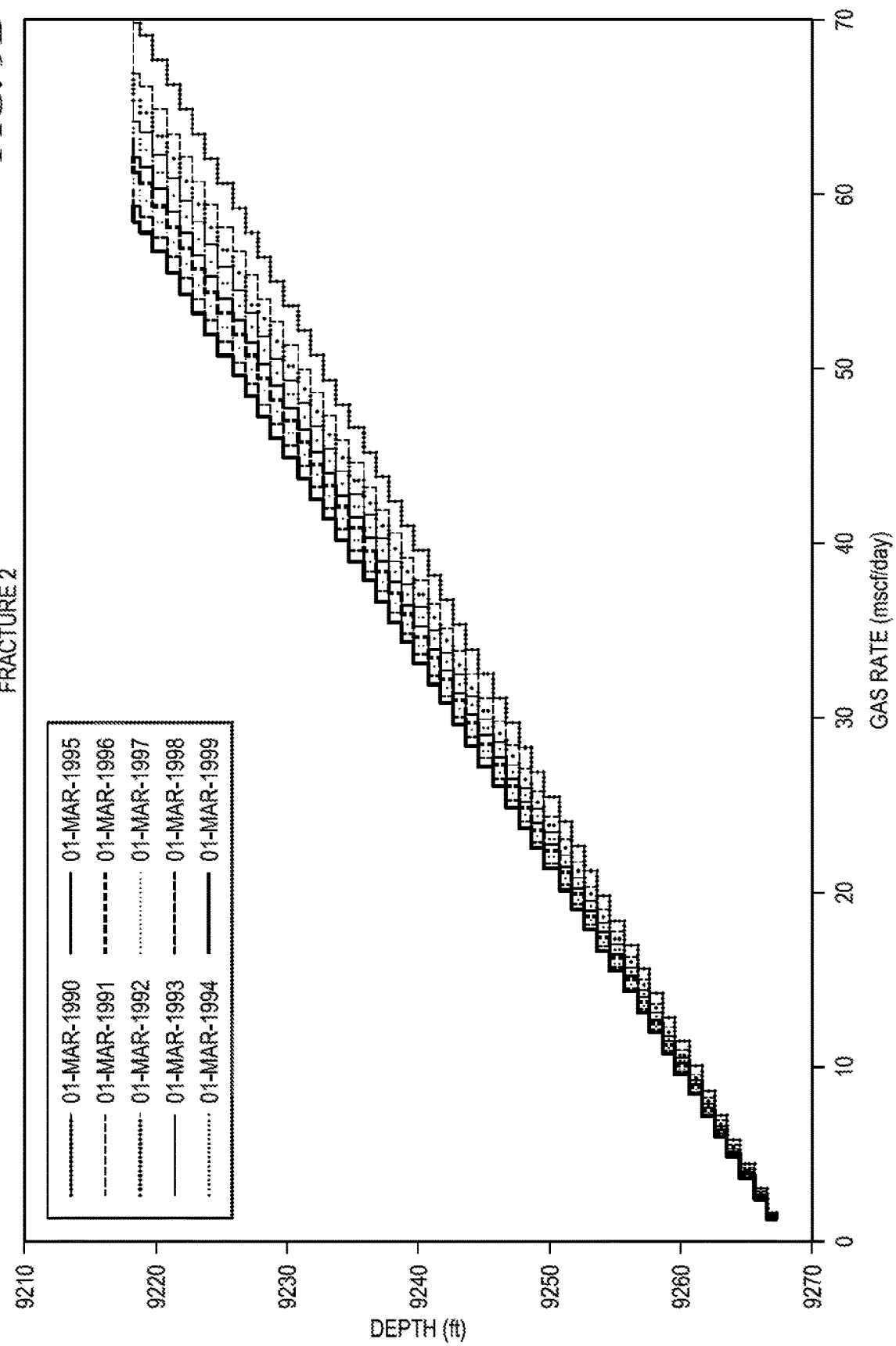

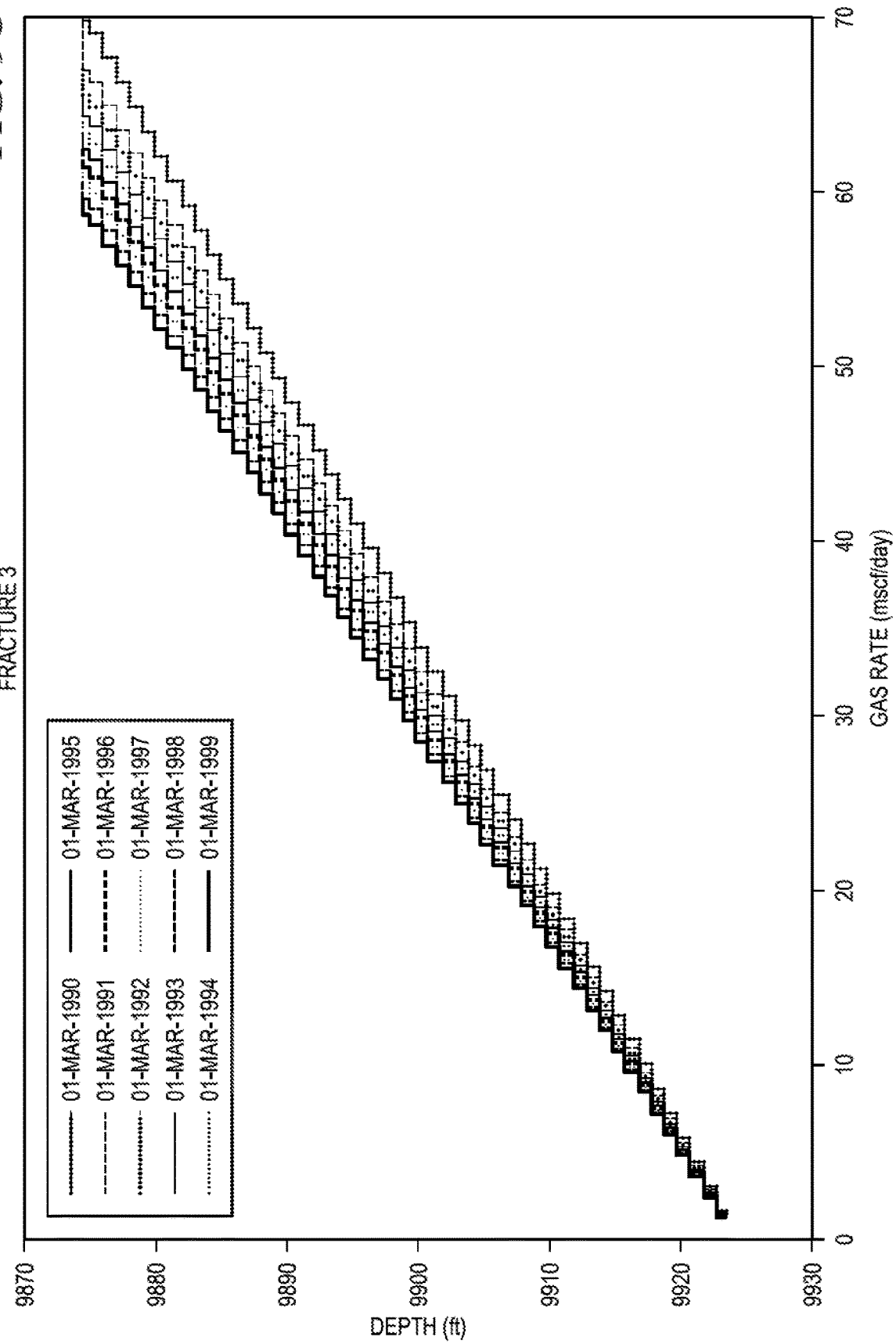

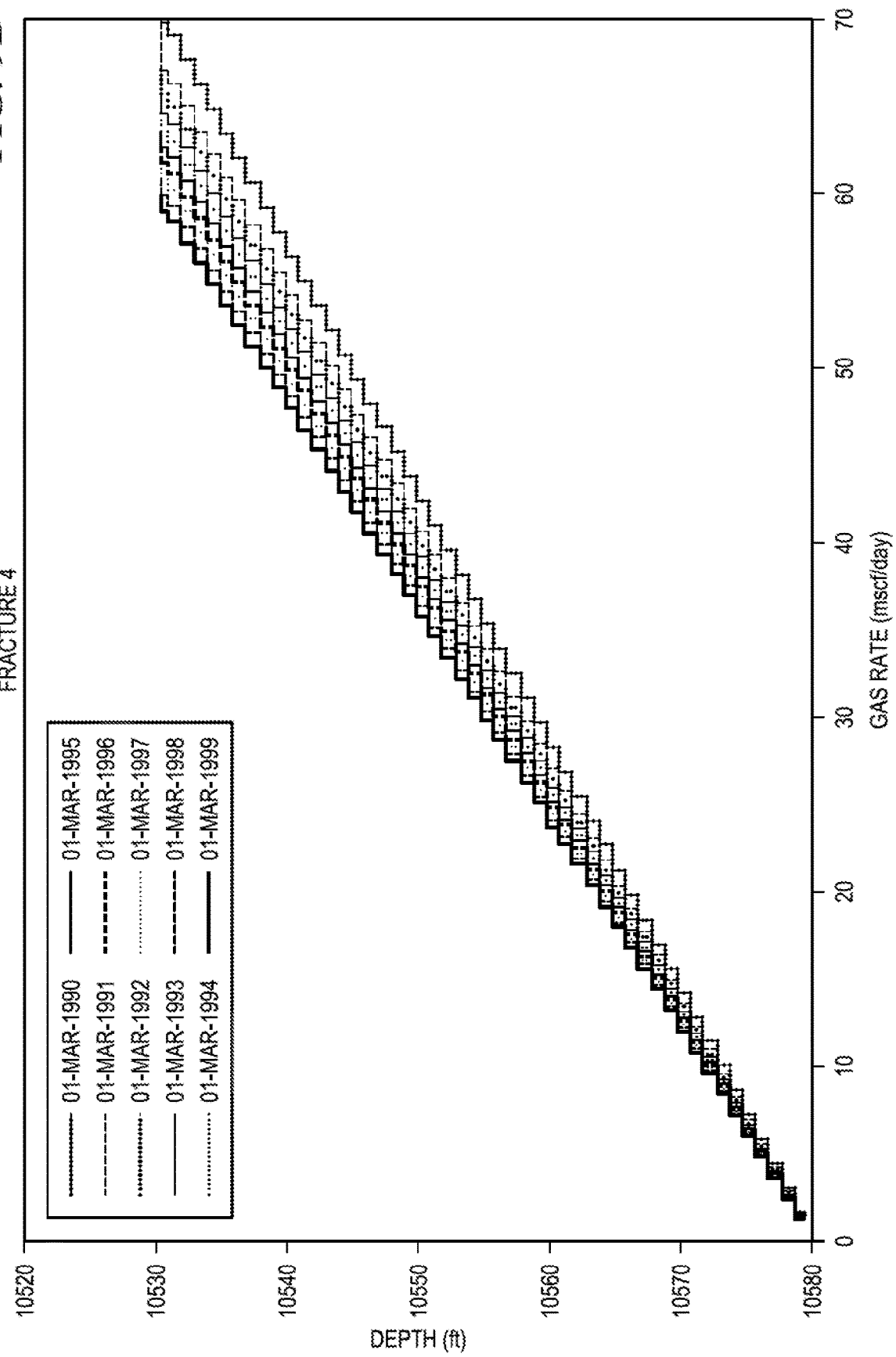

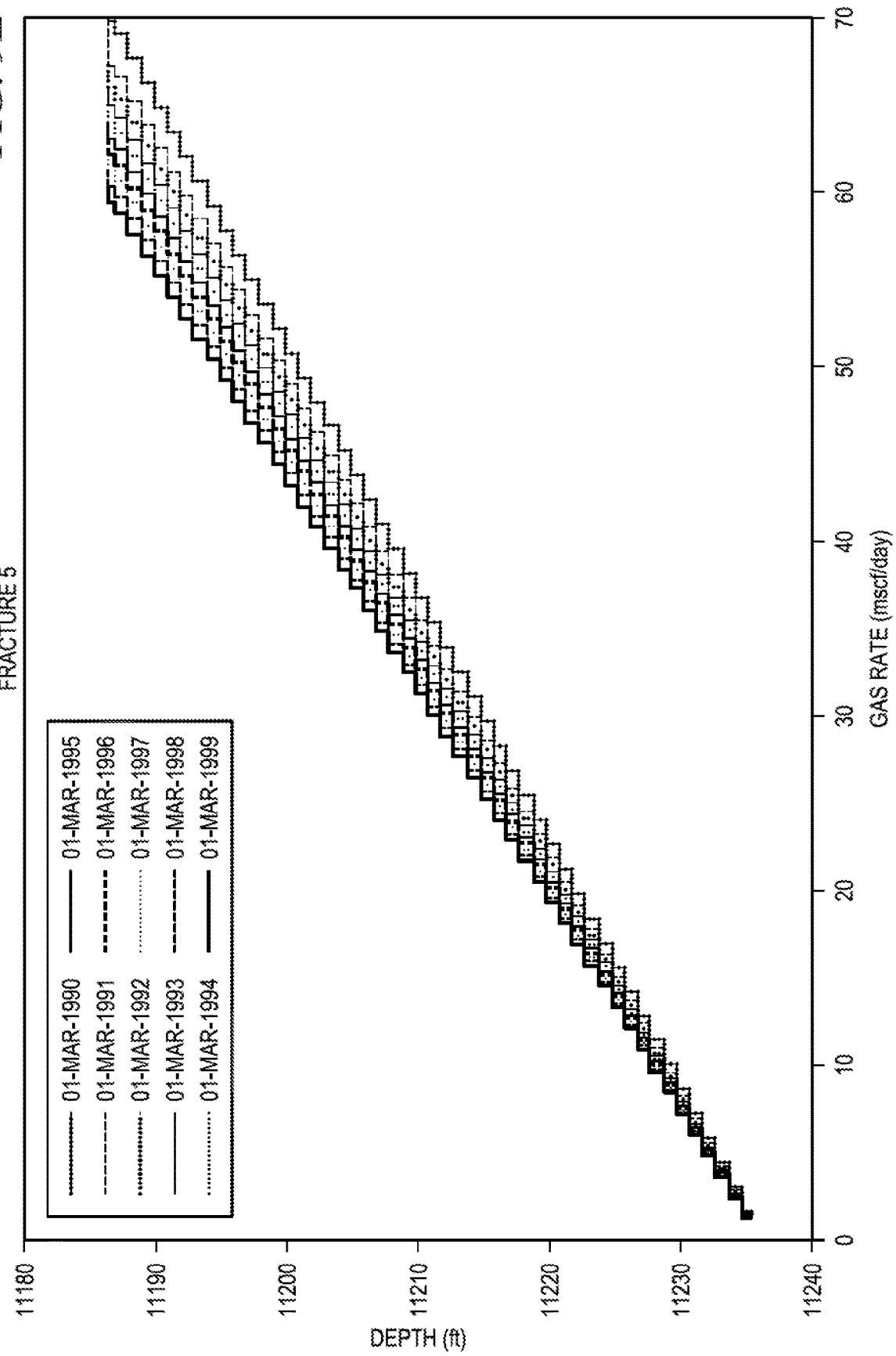

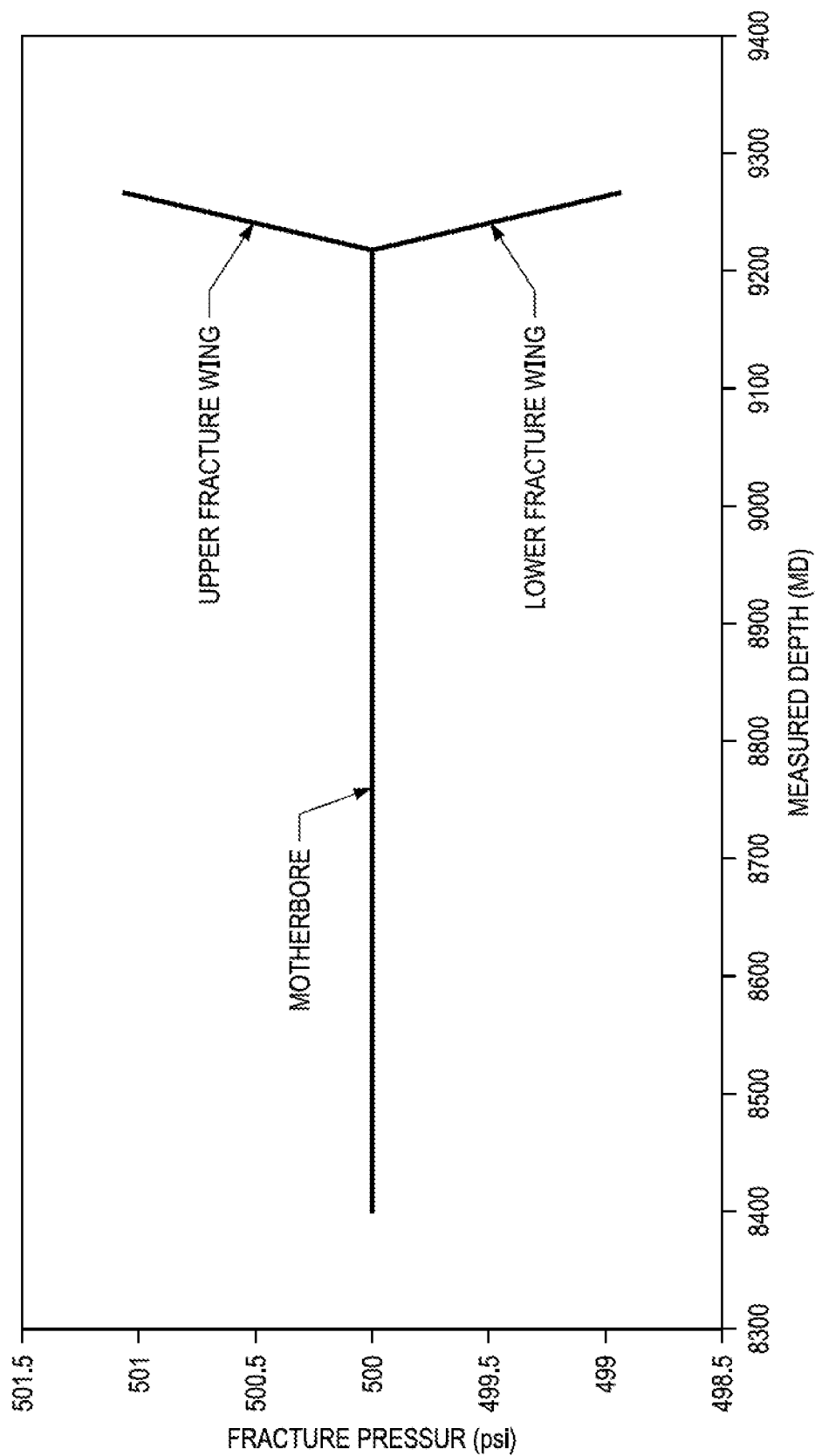

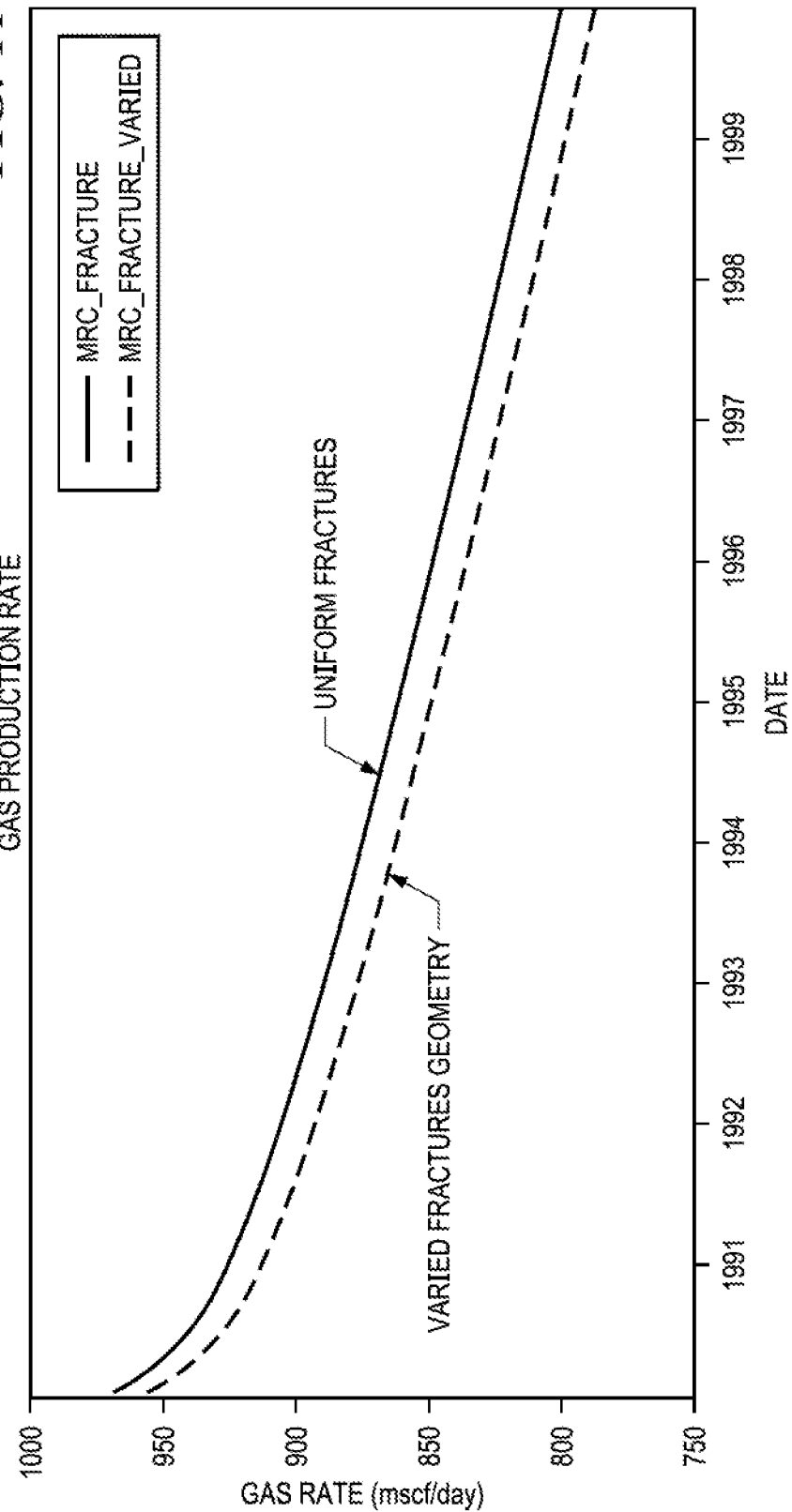

MODELING FRACTURED WELLS

TECHNICAL FIELD

The present disclosure relates to modeling fractured wells.

BACKGROUND

In the oil and gas industry, hydraulic fracturing is used to perform a well stimulation treatment that negates near-wellbore damage caused by drilling operations or creates improved paths for fluid to flow from formations to wells. A hydraulically fractured well (or "fractured well") includes a wellbore (for example, a horizontal wellbore) and fractures that extend from the wellbore into the formation. Hydraulic fracturing is a complex engineering operation that requires knowledge in reservoir engineering, fluid flow in porous media, rock elasticity, and geomechanics.

SUMMARY

Several factors are important for establishing successful hydraulic fracturing operations, including detailed design of hydraulic fractures, careful operation and execution, and accurate modeling of hydraulic fractures. There are existing simulators that model fractured wells for the purposes of history matching and predicting well performance (for example, hydrocarbon flow, formation pressure, and hydrocarbon production). Many of these simulators use grid refinement to explicitly represent hydraulic fractures in simulation models. Grid refinement, also called a local grid refinement (LGR) process, refines coarse grid blocks into smaller cells.

However, existing simulators have many deficiencies. As an example, existing simulators are merely capable of assessing the performance of a single fractured well. Such an assessment misses important information related to areas surrounding the fractured well. Further, the type of modeling performed by existing simulators is considered an approximation, at best, since many assumptions on which the simulators operate are inaccurate. For example, existing simulators assume that hydraulic fractures are uniform in production and performance, whereas in reality, hydraulic fractures are not uniform. Additionally, existing simulators do not capture the individual parameters of hydraulic fractures, such as fracture half length ($X_f$), fracture width ($W_f$), and fracture height ($h_f$). Furthermore, existing simulators are not capable of generating simulation results not on the hydraulic fracture level. In sum, existing simulators provide inaccurate approximations and are not capable of generating individual performance profiles for hydraulic fractures.

This disclosure describes methods and systems for modeling fractured wells, for example, on a full field scale. Aspects of the subject matter described in this specification may be embodied in methods that include the operations for simulating performance of a reservoir that includes a fractured well. Disclosed are methods, systems, and computer-readable medium to perform operations including: receiving, by a computing device, parameters of the fractured well, where the fractured well includes a wellbore and one or more hydraulic fractures extending from the wellbore; generating, by the computing device and based on the parameters of the fractured well, an equivalent complex well that represents the fractured well; and executing, by the computing device and using the equivalent complex well, a simulation that simulates the performance of the fractured well.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the equivalent complex well is a multilateral well that includes a motherbore and one or more lateral wellbores, where the motherbore represents the wellbore of the fractured well, and where each lateral wellbore represents a respective hydraulic fracture.

In some implementations, the parameters of the fractured well include at least one of: (i) a length of the wellbore, (ii) respective fracture half-lengths ($X_f$) of the one or more hydraulic fractures, (iii) respective fracture heights ($h_f$) of the one or more hydraulic fractures, (iv) respective fracture widths ($W_f$) of the one or more hydraulic fractures, or (v) a hydraulic fracture spacing intensity.

In some implementations, generating, by the computing device and based on the parameters of the fractured well, the equivalent complex well involves: modeling each hydraulic fracture by a respective rectangular tube, where dimensions of the respective rectangular tube is based on dimensions of the hydraulic fracture.

In some implementations, generating, by the computing device and based on the parameters of the fractured well, the equivalent complex well further involves: generating a motherbore of the equivalent complex well to represent the wellbore of the fractured well.

In some implementations, generating, by the computing device and based on the parameters of the fractured well, the equivalent complex well further involves: converting the respective rectangular tube into a respective wellbore, where the respective wellbore has an equivalent wellbore diameter calculated based on the dimensions of the respective rectangular tube, and where a length of the respective wellbore is equal to a height of the respective rectangular tube.

In some implementations, executing, by the computing device and using the equivalent complex well, the simulation involves: generating, using a multi-segmentation approach, a model of the equivalent complex well, where the model includes one or more respective segments for at least one of the wellbore or the one or more hydraulic fractures.

In some implementations, executing, by the computing device and using the equivalent complex well, the simulation further involves: generating a computation matrix for the model of the equivalent complex well, where the wellbore computational matrix includes a system of linear algebraic equations that represent at least one of mass balance equations, momentum balance equations, or energy balance equations for the one or more respective segments; and solving the computation matrix and determining that a solution to the computation matrix has converged to an acceptable tolerance.

In some implementations, the operations further involve generating, based on the simulation, at least one graph that represents individual production and performance profiles for the one or more hydraulic fractures; and causing, by the computing device, a display device to display the at least one graph.

In some implementations, the operations further involve: determining, based on the simulation, a hydraulic fracture design of a well to be drilled; and controlling, by the computing device, at least one drilling device to drill the well according to the hydraulic fracture design.

In some implementations, the operations further involve coupling a solution of the simulation to a reservoir simulation, where the coupling is explicit, sequential, or implicit.

The subject matter described in this specification can be implemented in particular implementations so as to realize one or more of the following advantages. The disclosed techniques can individually model each hydraulic fracture of a fractured well. More specifically, the disclosed techniques facilitate a fracture level representation and modification for each hydraulic fracture. As such, the disclosed techniques can model non-uniform fractures that have different properties. The disclosed techniques also enable wellbore level modifications to match individual fracture performance without the need to alter geological reservoir properties. By matching the fracture contribution to historical performance, a more accurate prediction of future performance can be obtained, for example, for field development planning activities. This facilitates practical planning for future wells to be drilled with hydraulic fracture designs that ensure effective stimulation jobs, thereby improving well productivity and recovery. Further, the disclosed techniques can be performed on a large scale field level for reservoirs that include hundreds to thousands of wells of different types. This achieves "big picture" modeling for reservoirs.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 8, 9A, 9B, 9C, 9D, 9E, and 10 illustrate results of a first simulation that implements a disclosed workflow, according to some implementations of the present disclosure.

FIGS. 11 and 12 illustrate results of a second simulation that implements a disclosed workflow, according to some implementations of the present disclosure.

Like reference numbers and designations in the various drawings indicate like elements.

DETAILED DESCRIPTION

This disclosure describes techniques for modeling fractured wells. In some embodiments, the techniques model a fractured well as a complex well, perhaps by generating a complex well (referred to in this disclosure as an "equivalent complex well") that represents the fractured well. Compared to existing modeling techniques, modeling the fractured well as a complex well achieves a more accurate representation of hydraulic fracture geometry. For example, modeling the fractured well as such enables modeling the individual parameters of hydraulic fractures. In some embodiments, the equivalent complex well is a multilateral well. In these embodiments, a wellbore of the fractured well is represented by a motherbore of the multilateral well, and hydraulic fractures of the fractured well are represented by lateral wellbores of the multilateral well. The disclosed techniques then use complex well modeling to simulate performance of the equivalent complex well, thereby simulating performance of the fractured well. Simulating performance of the fractured well provides information indicative of hydrocarbon recovery, such as hydrocarbon flow and pressure under one or more producing scenarios.

Generally, complex well modeling is used to model complex wells such as horizontal, multilateral, maximum reservoir contact (MRC), and extended reach drilling (ERD) wells. A multilateral well has two or more lateral wellbores (also referred to as laterals) that extend from a primary wellbore (also referred to as a motherbore). The laterals can be horizontal, vertical, or deviated from the primary wellbore. Complex well modeling can model various aspects of complex wells, including pressure losses, multiphase effects, and mechanical devices (for example, internal control devices and interval control valves).

Complex well modeling uses a multi-segmentation approach or a general network graph approach. In the multi-segmentation approach, well trajectories are divided into a plurality of segments. Then, transfer equations (for example, mass balance equations, momentum balance equations, and energy balance equations) are generated for each segment. During a simulation, the transfer equations are solved for each segment. On the other hand, in the general network graph approach, well trajectories are divided into nodes and links. In this approach, links represent well segments and mechanical devices, and nodes represents connections between the links. During a simulation, mass balance equations and momentum balance equations are solved for each link or node, where molar rate is a link property and pressure is a node property. Additionally, well operating conditions, such as rates and pressures, are formulated as constraint equations that serve as boundary conditions for solving the complex well model.

Figure 1:
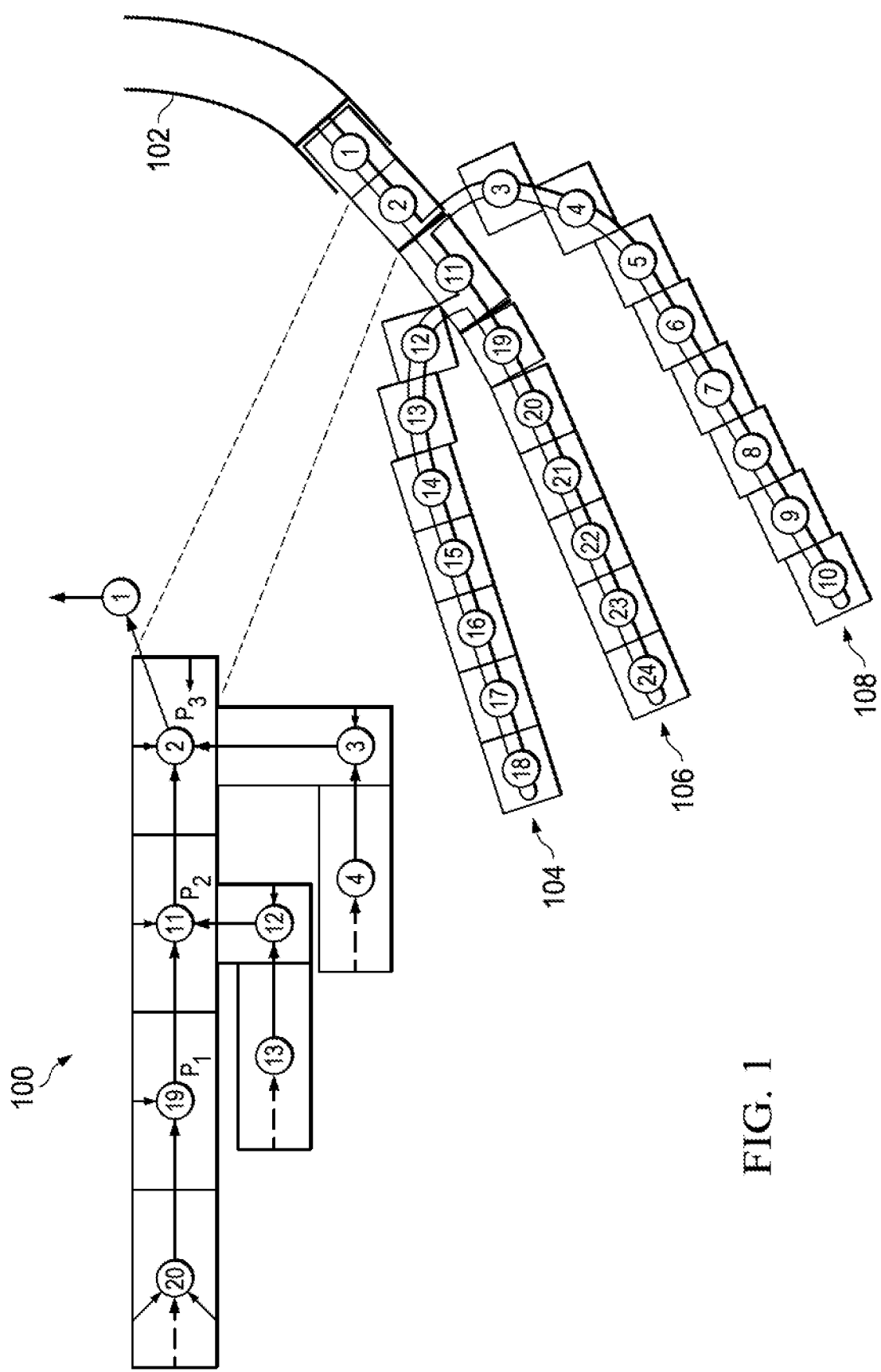
FIG. 1 illustrates an example multi-segment model for a complex well, according to some implementations of the present disclosure.

FIG. 1 illustrates an example multi-segment model 100 for a complex well, according to some implementations. In this example, the complex well is a multilateral well that includes a primary wellbore 102, a motherbore 106, and laterals 104, 108 that branch from the motherbore 106. The section of the motherbore 106 that meets the primary wellbore 102 is referred to as a heel, and the opposite end of the motherbore is referred to as a toe. As shown in FIG. 1, the multi-segment model 100 includes one or more respective segments for each of the motherbore 106 and the laterals 104, 108. The one or more respective segments are labelled as segments 1-24. During a simulation, transfer equations are solved for each segment.

Figure 2:
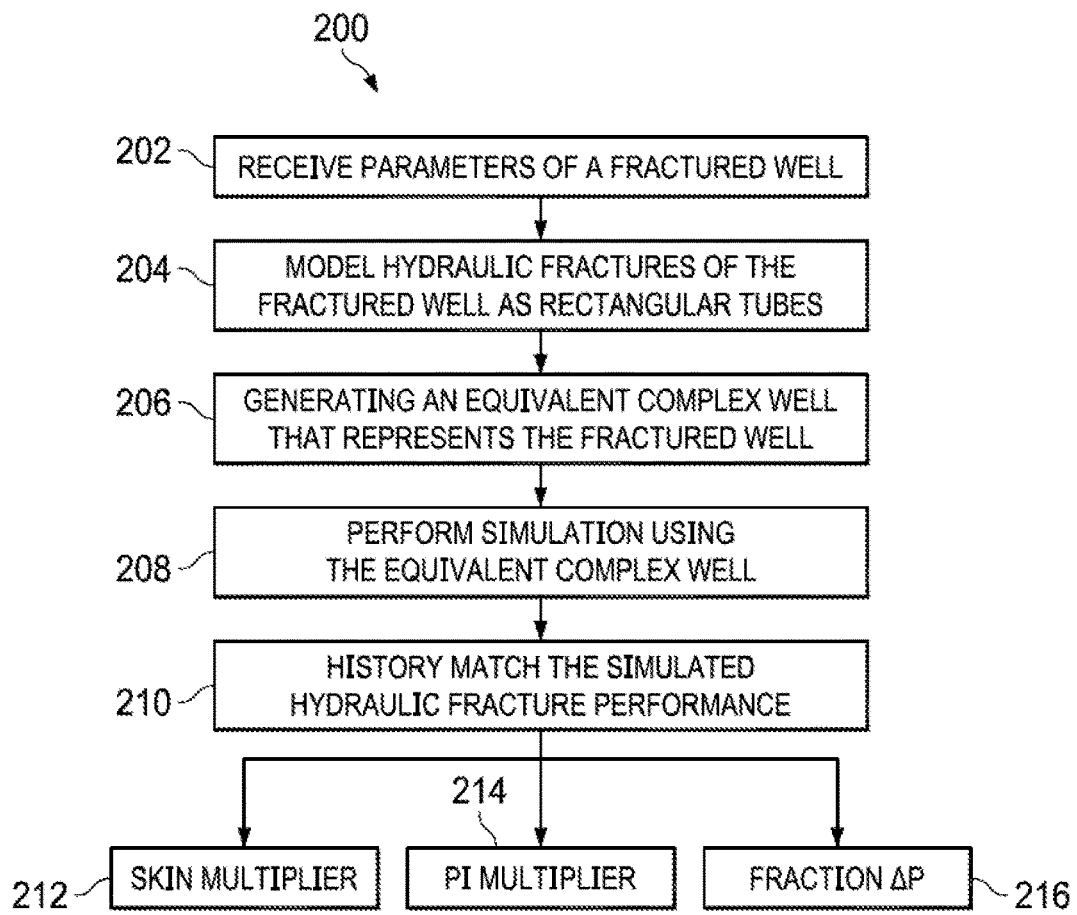
FIG. 2 illustrates a workflow for simulating a fractured well, according to some implementations of the present disclosure.

FIG. 2 illustrates a workflow 200 for simulating a fractured well, according to some implementations. As described below, the workflow 200 generates an equivalent complex well that represents the fractured well. In an example, the equivalent complex well is a multilateral well. In this example, a wellbore of the fractured well is represented by a motherbore of the multilateral well, and hydraulic fractures of the fractured well are represented by lateral wellbores of the multilateral well. Once the equivalent complex well is generated, complex well modeling (for example, multi-segmentation) is used to simulate performance of the fractured well by simulating performance of the equivalent complex well.

Figure 13:
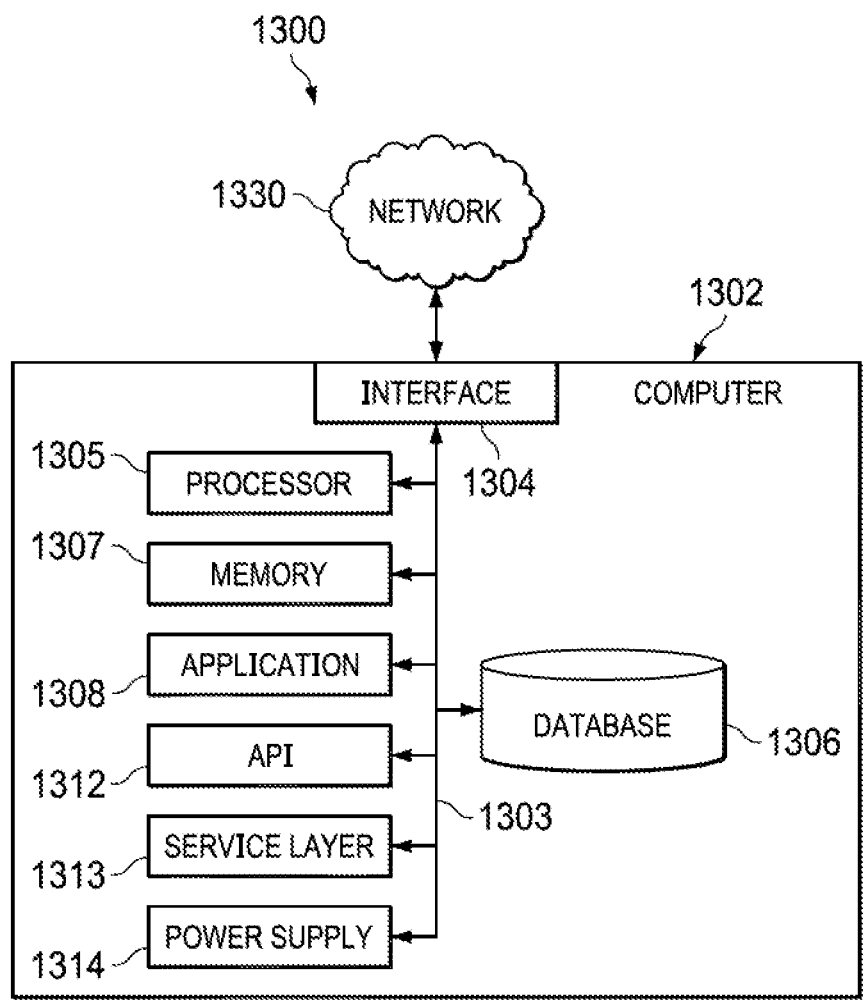
FIG. 13 illustrates a block diagram illustrating an example computer system used to provide computational functionalities associated with described algorithms, methods, functions, processes, flows, and procedures as described in the present disclosure, according to some implementations of the present disclosure.

In some embodiments, the workflow 200 is performed by one or more computing systems, for example, the computer system 1300 of FIG. 13, or by any suitable system, environment, software, hardware, or a combination of systems, environments, software, and hardware, as appropriate. In the following discussion of the workflow 200, reference is also made to FIG. 3, FIG. 4A, FIG. 4B, FIG. 5, and FIG. 6. Additionally, although the following discussion describes simulating a single fractured well, the workflow 200 can consecutively or simultaneously simulate a plurality of both non-fractured and fractured wells (for example, on the order of tens or hundreds of wells).

At step 202, the workflow 200 involves receiving, perhaps from a database or user input, parameters of the fractured well. The parameters of the fractured well include wellbore parameters and hydraulic fracture parameters. The wellbore parameters include a length of the wellbore, and the hydraulic fracture parameters include a fracture half-length ($X_f$), a fracture height ($h_f$), a fracture width ($W_f$) of each hydraulic fracture. In some examples, step 202 also involves receiving a hydraulic fracture spacing intensity. Hydraulic fracture spacing intensity spacing intensity refers to a minimum distance to maintain between adjacent fractures when designing a hydraulic fractures job.

Figure 3:
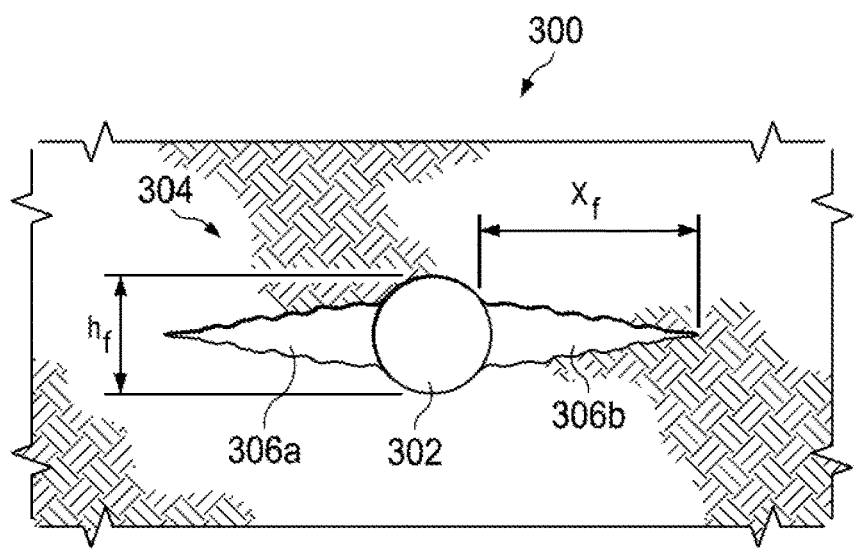
FIG. 3 illustrates a side view of a fractured well, according to some implementations of the present disclosure.

FIG. 3 illustrates a side view 300 of a fractured well, according to some implementations. The fractured well includes a wellbore and hydraulic fractures that extend from the wellbore. In some examples, a hydraulic fracture includes two wings, each of which extend from opposite sides of the wellbore. In FIG. 3, the fractured well includes a horizontal wellbore 302 and a hydraulic fracture 304. The hydraulic fracture 304 includes wings 306a, 306b that extend from the horizontal wellbore 302 into the formation. As shown in FIG. 3, a half-length ($X_f$) of the hydraulic fracture 304 is a distance from the horizontal wellbore 302 to a distal point of the hydraulic fracture 304. That is, the half-length is a length of one wing of the hydraulic fracture 304.

Returning to FIG. 2, at step 204, the workflow 200 involves modeling the hydraulic fractures as rectangular tubes. This step is performed in preparation for generating an equivalent complex well that represents the fractured well in the next step. In some examples, the hydraulic fractures are modeled as rectangular tubes that extend in orthogonal directions from the wellbore. The dimensions of the rectangular tubes are based on the geometries of the hydraulic fractures. More specifically, a rectangular tube that represents a hydraulic fracture has a length equal to two times the half-length of that hydraulic fracture (that is, length=$2 \ast X_f$), a width equal to the fracture width of that hydraulic fracture (that is, width=$W_f$), and a height equal to the fracture height of that hydraulic fracture (that is, height=$h_f$). In some examples, a rectangular tube that represents a hydraulic fracture includes two sections, each of which represents one wing of the hydraulic fracture. In these examples, each rectangular section has a height equal to $h_f$, a width equal to $W_f$, and a length equal to $X_f$.

Figure 4A:
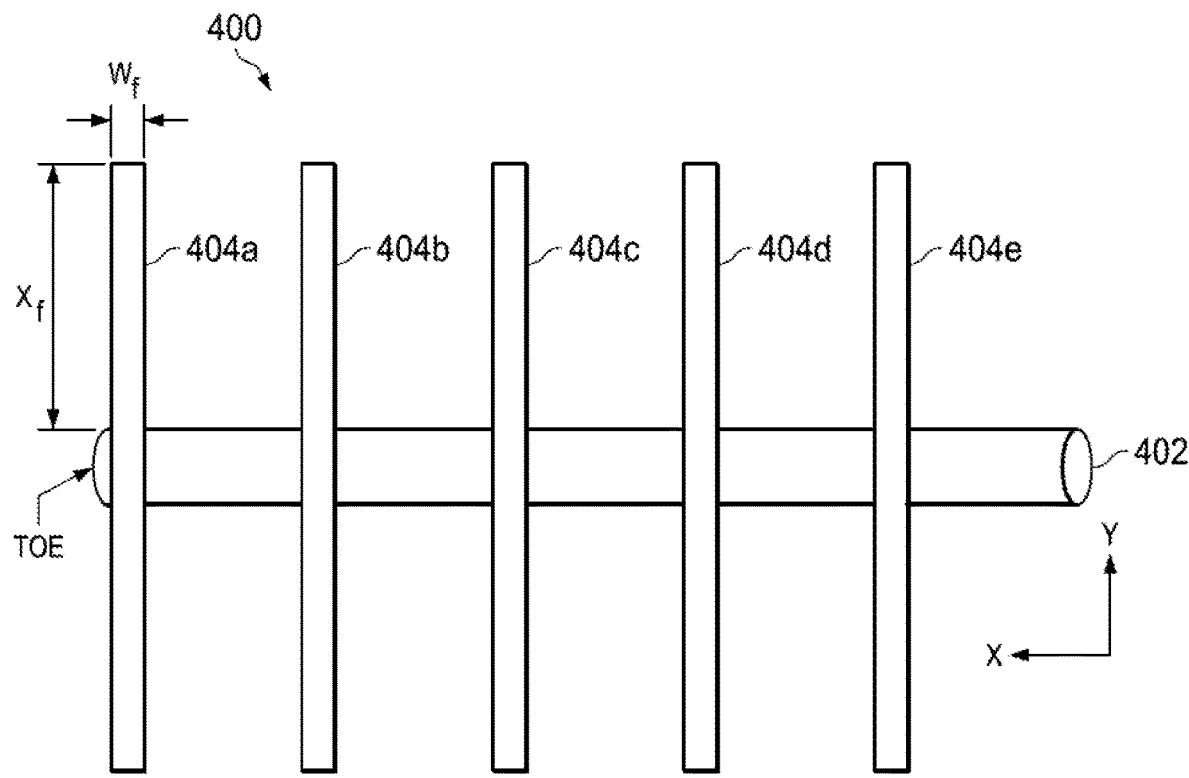
FIG. 4A and FIG. 4B illustrate hydraulic fractures modeled as rectangular tubes, according to some implementations of the present disclosure.
Figure 4B:
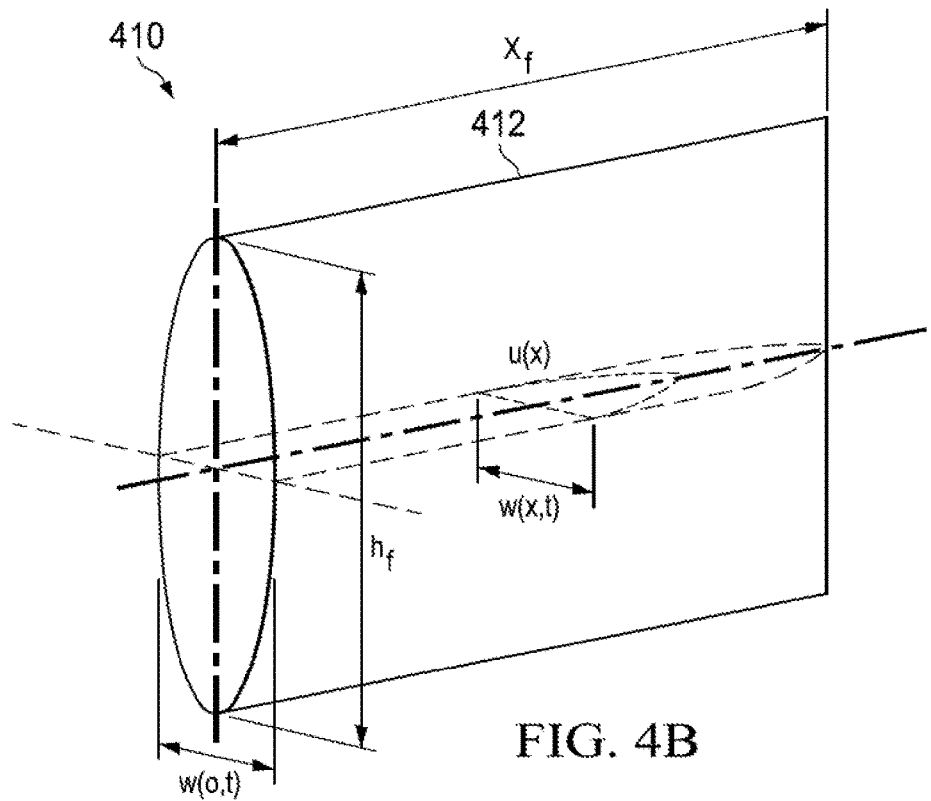

FIG. 4A and FIG. 4B illustrate hydraulic fractures modeled as rectangular tubes, according to some implementations. FIG. 4A illustrates a top view 400 of a fractured well that includes a horizontal wellbore 402 and hydraulic fractures. The hydraulic fractures are represented as rectangular tubes 404a, 404b, 404c, 404d, and 404e that extend orthogonally from the horizontal wellbore 402. In this example, the hydraulic fractures have identical geometries, and therefore, the rectangular tubes 404a, 404b, 404c, 404d, and 404e have identical dimensions. That is, each rectangular tube has a length equal to $2 \ast X_f$ and a width equal to $W_f$. FIG. 4B illustrates a perspective view 410 of a section 412 of a rectangular tube that represents one wing of a hydraulic fracture. As shown in FIG. 4B, the section 412 has a height equal to $h_f$, a width equal to $W_f$, and a length equal to $X_f$.

Returning to FIG. 2, at step 206, the workflow 200 involves generating an equivalent complex well that represents the fractured well. In this step, the wellbore of the fractured well is modeled as a motherbore of a multilateral well. Further, the hydraulic fractures are modeled as open hole laterals that emanate from the motherbore. In order to model the hydraulic fractures as such, the rectangular tubes are converted into lateral wellbores. To convert a rectangular tube into a lateral, an equivalent wellbore diameter for the lateral is calculated. The equivalent wellbore diameter is used to calculate a circular equivalent to a rectangular tube. In an example, the equivalent wellbore diameter is calculated using Equation (1), which is an equation for calculating a hydraulic diameter of a rectangular tube:

$$\text{Equivalent Diameter } (d) = 4 \times \frac{\text{Area}}{\text{Perimeter}}, . \qquad \text{Equation (1)}$$

As shown in Equation (1), the equivalent wellbore diameter of a rectangular tube is based on an area and a perimeter of the tube. In Equation (2), the equivalent wellbore diameter of a rectangular tube that represents a hydraulic fracture is calculated using a fracture half-length ($X_f$) and a fracture width ($W_f$) of the hydraulic fracture:

$$d = 4 \times \frac{2 X_f \times W_f}{2 \times (2 \times X_f + W_f)}, . \qquad \text{Equation (2)}$$

Thus, each hydraulic fracture is represented using a lateral wellbore (that is, a circular wellbore) that has a diameter equal to the calculated equivalent diameter for that hydraulic fracture, and a length equal to the fracture height ($h_f$) of that hydraulic fracture.

Figure 5:
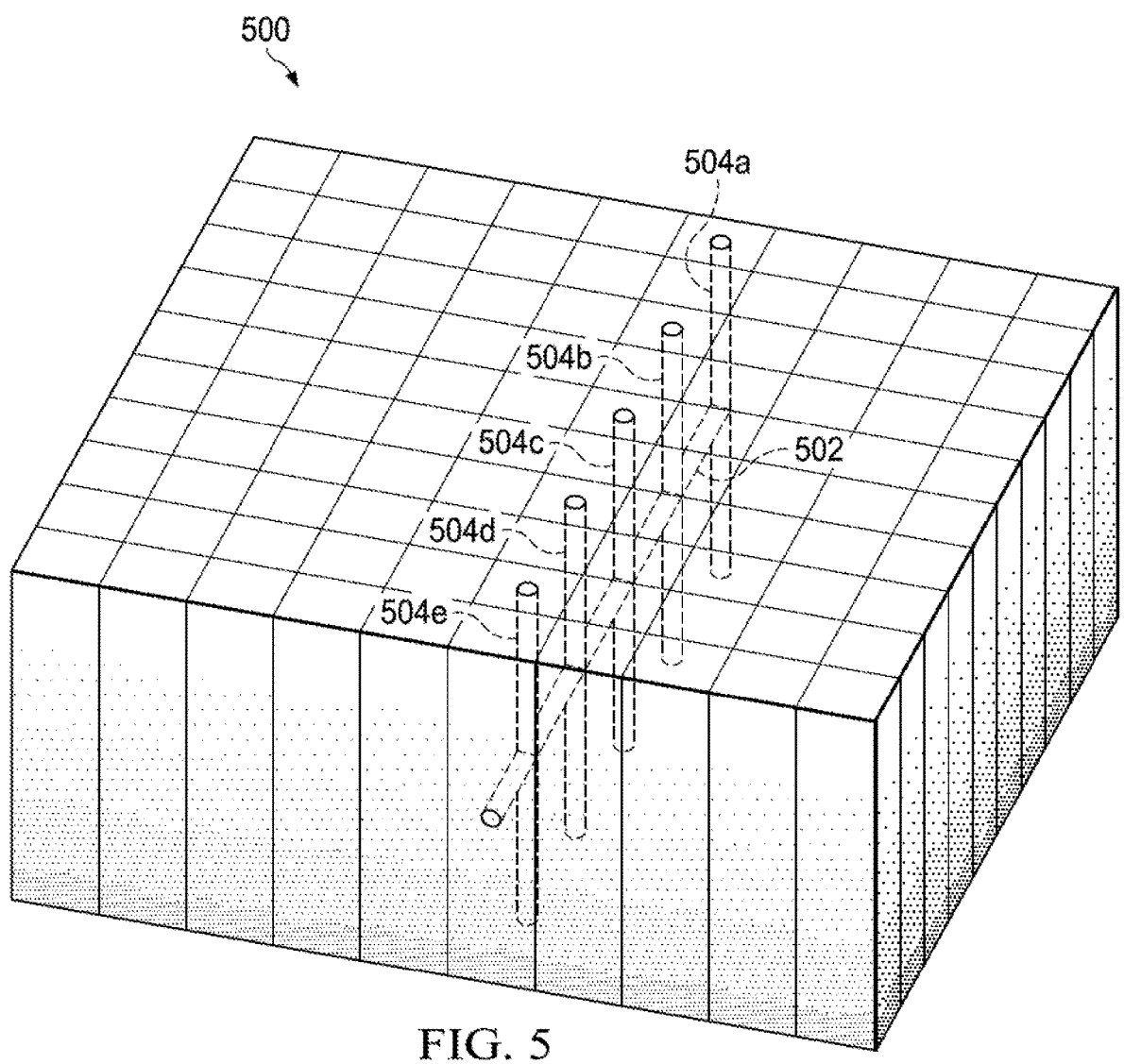
FIG. 5 illustrates an equivalent complex well that represents a fractured well, according to some implementations of the present disclosure.

FIG. 5 illustrates an equivalent complex well 500 that represents a fractured well, according to some implementations. In FIG. 5, a horizontal motherbore 502 represents the wellbore of the fractured well (for example, the horizontal wellbore 402). Further, vertical lateral wellbores 504a, 504b, 504c, 504d, and 504e, which are orthogonal to the horizontal motherbore 502, represent the hydraulic fractures of the fractured wellbore (for example, the hydraulic fractures 404a, 404b, 404c, 404d, and 404e). Each vertical lateral wellbore has a respective equivalent diameter that is calculated based on the dimensions of the corresponding hydraulic fracture. Further, each vertical wellbore has a length equal to the respective fracture height ($h_f$) of the corresponding hydraulic fracture.

Returning to FIG. 2, at step 208, the workflow 200 involves performing a simulation using the equivalent complex well. By performing a simulation using the equivalent complex well, the fractured well is being simulated. In this step, complex well modeling techniques, such as the multi-segmentation approach or the general network approach, are used to model the equivalent complex well. For instance, the multi-segmentation approach can be used to segment the equivalent complex well into one or more segments. More specifically, each of the motherbore and the laterals can be segmented into one or more respective segments. Equivalently, the wellbore of the fractured well and the hydraulic fractures of the fractured well are being segmented into one or more respective segments.

In some embodiments, an input simulation file that includes a detailed physical representation of the fractured well is generated. In examples where the multi-segmentation approach is used, the input simulation file includes a system of linear algebraic equations that represent at least one of mass balance equations, momentum balance equations, or energy balance equations for the segments of the complex well. The input simulation files can be run by a grid simulator to compute the performance of the fractured well (for example, hydrocarbon flow and hydrocarbon production) and to generate individual production and performance profiles (for example, pressure and flow rate profiles) for the hydraulic fractures of the fractured well. During the simulation, detailed computations of pressure and flow rate profiles are performed for the segments of the complex well.

In some embodiments, the grid simulator simulates the equivalent complex well as part of an overall reservoir simulation. In these embodiments, the grid simulator performs the reservoir simulation in two steps. In the first step, the equivalent complex well is simulated. In the second step, the solution of the complex well simulation is coupled to the reservoir simulation. In one example, the equivalent complex well is simulated by generating a Jacobian matrix that includes the system of linear algebraic equations that is associated with the equivalent complex well. The grid simulator solves the Jacobian matrix, perhaps using the Newton-Raphson method. The Newton-Raphson method iteratively solves the Jacobian matrix until the solutions to the Jacobian matrix converge; for example, satisfy a predetermined tolerance, perhaps of the spectral radius of the iteration. The predetermined tolerance for the convergence is an absolute or relative tolerance on change of individual variables (convergence on change) and/or a predefined tolerance for change of residual (convergence on residual). Further, during each Newton iteration, the Newton-Raphson method calculates and solves an updated Jacobian matrix. Once the solutions converge, they are then coupled with the reservoir simulation. The coupling can be explicit, sequential, or implicit.

Figure 6:
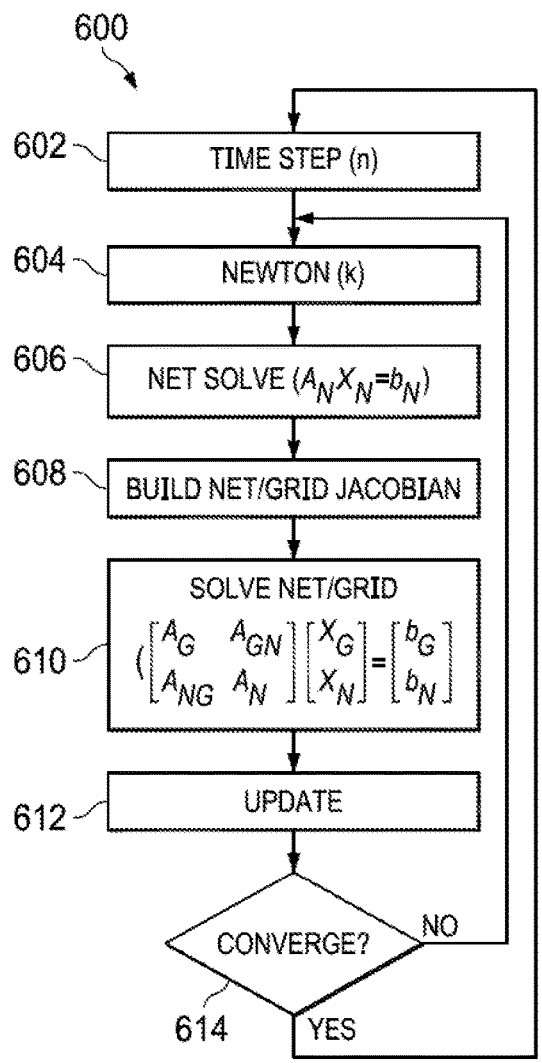
FIG. 6 illustrates a workflow for implicitly simulating a reservoir that includes a fractured well, according to some implementations of the present disclosure.

In some embodiments, the solutions to the equivalent complex well are implicitly coupled to the reservoir simulation. In these embodiments, the equivalent complex well is solved together as one system with the reservoir grid. The boundary condition of the equivalent complex well is updated for each iteration. Further, both the reservoir grid and the equivalent complex well are solved in each Newton iteration. Specifically, the Jacobian matrix for the whole system, including the reservoir grid and the equivalent complex well, is built and the whole system is solved implicitly. If the solution converges, the grid simulator proceeds to the next time step. Otherwise, the grid simulator goes back to the Newton iteration. FIG. 6 shows the workflow of the implicit coupling to solve the whole system.

FIG. 6 illustrates a workflow 600 for implicitly simulating a reservoir that includes a fractured well, according to some implementations. The workflow 100 involves performing the simulation for n time steps, as shown by block 602. During each time step, the Newton-Raphson method is iteratively performed over k Newton iterations, as shown by block 604. During a Newton iteration, the grid simulator solves a Jacobian matrix that represents an equivalent complex well, as shown by block 606. Specifically, the grid simulator solves for $A_N$ (the Jacobian matrix for complex well network) using $A_N X_N = b_N$, where $X_N$ is variables in a complex well network and $b_N$ is a residual for the complex well network. The grid simulator then builds a Jacobian matrix for the reservoir, as shown by block 608. Then, the grid simulator solves the Jacobian matrix for the reservoir, as shown by block 610. The variables of the equation in block 610 are defined as:

$A_G$: Jacobian matrix for the grid
$A_{GN}$: Jacobian matrix for grid to network
$A_{NG}$: Jacobian matrix for network to grid
$X_G$: Variables in grid system
$b_G$: Residual for grid As shown by block 612, the grid simulator updates the solutions based on the solved Jacobian matrix for the reservoir. The grid simulator then determines whether the updated solutions have converged, as shown by block 614. If the solutions have converged, the grid simulator proceeds to the next time step. And if the solutions have not converged, the grid simulator proceeds to the next Newton iteration for the current time step.

In some embodiments, the grid simulator generates individual production and performance profiles for the hydraulic fractures of the fractured well. The simulation results include respective fracture production information for each fracture. Additionally, the simulation results include detailed results for each fracture. The detailed results for a fracture include the results corresponding to one or more segments that represent the fracture. Example simulation results are illustrated in FIGS. 8-12.

Returning to FIG. 2, at step 210, the workflow 200 involves history matching the simulated hydraulic fracture performance. In this step, one or more factors are applied to the simulation results of the hydraulic fractures. Because the hydraulic fractures are modeled individually, the one or more factors can be applied to a subset of the modeled hydraulic fractures or all of the modeled hydraulic fractures. Further, values of the one or more factors can be identical or different for different modeled hydraulic fractures. In scenarios where more than one segment is used to model a hydraulic fracture, the one or more factors can be applied individually to each segment. Thus, different values of the one or more factors can be selected for each segment of the same modeled hydraulic fracture. The workflow 200 has the flexibility to choose and select certain segments along the fracture length at which to apply skin factors. This achieves high definition history matching for fractured wells.

In some embodiments, the one or more factors include a productivity index (PI) multiplier, a skin factor multiplier, and a hydraulic fracture roughness. PI is a measure of a well's potential to produce and can be computed using Equation (3):

$$J = \frac{Q}{(P_r - P_{wf})}.$$ Equation (3)

In Equation (3), Q is a production flow rate in stock tank barrel/day (stb/d), $P_r$ is a reservoir static pressure in pounds per square inch (psi), and $P_{wf}$ is a well bottom hole flowing pressure in psi. The PI multiplier is a modification factor that has a value greater than zero. This factor is used to modify the simulation model flow rate and bottom hole pressure by increasing or decreasing it in order to match measured production performance without changing reservoir properties, such as porosity, permeability, or saturation. In complex well modeling, a respective segment PI multiplier can be applied to one or more modeled segments (for example, a fracture or a portion thereof).

Skin is a dimensionless estimation of flow stoppage or jam. The skin value can be positive which indicates wellbore damage or an obstruction (for example, due to excess heavy weight drilling fluid damage to the formation). A negative skin value, on the other hand, reflects improvement in the flow path and significant reduction to formation damage. The skin factor is used to improved or reduce simulation model flow rate in order to match a tested production flow rate of a particular well. For hydraulic fractures, the skin factor is applied at one or more segments to mimic a measured performance profile.

Hydraulic fracture roughness refers to the changes or irregularities in the surface texture of a hydraulic fracture. Hydraulic fracture roughness results in a pressure drop referred to as friction ΔP. When history matching hydraulic fracture performance, roughness values are used to improve pressure match with certain flow rates.

Figure 7:
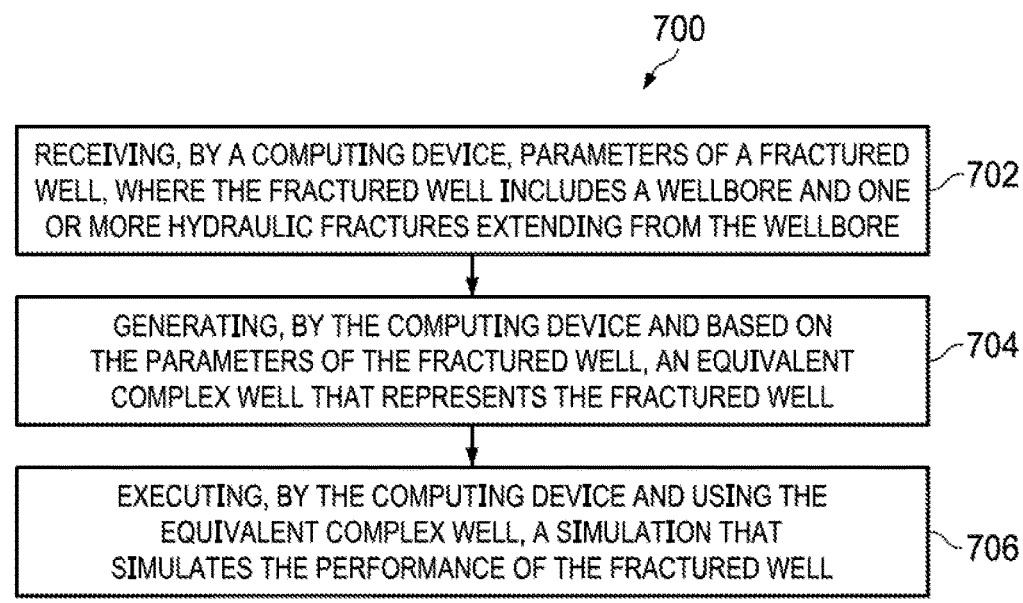
FIG. 7 illustrates a flowchart of an example method, according to some implementations of the present disclosure

FIG. 7 illustrates a flowchart of an example method 700 for simulating performance of a fractured well, according to some implementations. For clarity of presentation, the description that follows generally describes method 700 in the context of the other figures in this description. For example, the method 700 can be performed by the computer system 1300 of FIG. 13. However, it will be understood that the method 700 may be performed, for example, by any suitable system, environment, software, and hardware, or a combination of systems, environments, software, and hardware, as appropriate. In some implementations, various steps of the method 500 can be run in parallel, in combination, in loops, or in any order.

At step 702, method 700 involves receiving, by a computing device, parameters of a fractured well, where the fractured well includes a wellbore and one or more hydraulic fractures extending from the wellbore. In some examples, the parameters of the fractured well include at least one of: (i) a length of the wellbore, (ii) respective fracture half-lengths ($X_f$) of the one or more hydraulic fractures, (iii) respective fracture heights ($h_f$) of the one or more hydraulic fractures, (iv) respective fracture widths ($W_f$) of the one or more hydraulic fractures, or (v) a hydraulic fracture spacing intensity. FIG. 3 illustrates an example fractured well.

At step 704, method 700 involves generating, by the computing device and based on the parameters of the fractured well, an equivalent complex well that represents the fractured well. In some examples, the equivalent complex well is a multilateral well that includes a motherbore and one or more lateral wellbores, wherein the motherbore represents the wellbore of the fractured well, and wherein each lateral wellbore represents a respective hydraulic fracture. FIG. 5 illustrates an example equivalent complex well that represents a fractured well.

At step 706, method 700 involves executing, by the computing device and using the equivalent complex well, a simulation that simulates the performance of the fractured well. FIG. 6 illustrates an example workflow for implicitly simulating a reservoir that includes a fractured well.

In some implementations, generating, by the computing device and based on the parameters of the fractured well, the equivalent complex well involves modeling each hydraulic fracture by a respective rectangular tube, wherein dimensions of the respective rectangular tube is based on dimensions of the hydraulic fracture.

In some implementations, generating, by the computing device and based on the parameters of the fractured well, the equivalent complex well further involves generating a motherbore of the equivalent complex well to represent the wellbore of the fractured well.

In some implementations, generating, by the computing device and based on the parameters of the fractured well, the equivalent complex well further involves converting the respective rectangular tube into a respective wellbore, where the respective wellbore has an equivalent wellbore diameter calculated based on the dimensions of the respective rectangular tube, and where a length of the respective wellbore is equal to a height of the respective rectangular tube. FIG. 4A and FIG. 4B illustrate hydraulic fractures modeled as rectangular tubes.

In some implementations, executing, by the computing device and using the equivalent complex well, the simulation involves generating, using a multi-segmentation approach, a model of the equivalent complex well, wherein the model includes one or more respective segments for at least one of the wellbore or the one or more hydraulic fractures.

In some implementations, executing, by the computing device and using the equivalent complex well, the simulation further involves generating a computation matrix for the model of the equivalent complex well, wherein the wellbore computational matrix includes a system of linear algebraic equations that represent at least one of mass balance equations, momentum balance equations, or energy balance equations for the one or more respective segments; and solving the computation matrix and determining that a solution to the computation matrix has converged to an acceptable tolerance.

The example method 700 shown in FIG. 7 can be modified or reconfigured to include additional, fewer, or different steps (not shown in FIG. 7), which can be performed in the order shown or in a different order.

As an example, after step 706, the method 700 can include generating, based on the simulation, at least one graph that represents individual production and performance profiles for the one or more hydraulic fractures; and causing, by the computing device, a display device to display the at least one graph. FIGS. 8-12 illustrate simulation results of two example simulations.

As another example, the method 700 can include determining, based on the simulation, a hydraulic fracture design of a well to be drilled; and controlling, by the computing device, at least one drilling device to drill the well according to the hydraulic fracture design.

As yet another example, the method 700 can include coupling a solution of the simulation to a reservoir simulation, wherein the coupling is explicit, sequential, or implicit.

FIGS. 8-12 illustrate simulation results of two example simulations that implement the disclosed methods of simulating fractured wells, according to some implementations. The simulations can be executed by a grid simulator, which can run on one or more computing systems, such as the computer system 1300 of FIG. 13. In these simulations, the test reservoir is a homogenous single phase gas reservoir that includes a fractured well. The fractured well includes a horizontal well (for example, a gas producer) and five hydraulic fractures. The hydraulic fractures are numbered 1 thorough 5, where fracture 1 is the closest to the heel of the fractured well and fracture 5 is the closest to the toe. The properties of the test reservoir are summarized in Table 1.

TABLE 1

| Properties of Test Reservoir | |
|---|---|
| Model Size | 10 × 10 × 100 |
| Average Porosity | 0.11 |
| Average Permeability | 0.1 millidarcy (md) |
| Grid Dimension in X & Y | 100 meters (m) |
| Grid Dimension in Z | 1 foot |

The attributes of the fractured well in the first simulation are summarized in Table 2. In this simulation, the five hydraulic fractures have identical geometries.

TABLE 2

| Fractured Well Attributes of Simulation 1 | |
|---|---|
| Fracture Half Length ($X_f$) | 164 ft |
| Fracture Width ($W_f$) | 1.36 inch |
| Horizontal Wellbore Length | 1000 m |
| Fracture Height ($h_f$) | 100 ft |
| Fracture spacing intensity | 200 m |

In order for the grid simulator to perform the simulation, the fractured well is modeled as a complex well. More specifically, the hydraulic fractures are first modeled as rectangular tubes. The rectangular tubes are then transformed to lateral wellbores. When transforming the rectangular tubes to lateral wellbores, the equivalent wellbore diameter for the laterals is calculated using the attributes from Table 2. Using these values, the equivalent wellbore diameter is calculated as:

$$d = 4\frac{2X_f \times w_f}{2 \times (2 \times X_f + W_f)} = 4\frac{328 \times \frac{1.36}{12}}{2 \times \left(328 + \frac{1.36}{12}\right)} = 0.2266 \text{ feet (ft)}.$$

Further, the length of the laterals is equal to the fracture height, which is 100 ft. Further, the horizontal wellbore is modeled as a motherbore of a multilateral well that is 1000 m long. Once the complex well that represents the fractured well is generated, a multi-segmentation approach is used to segment the complex well. In this simulation, 100 segments are generated for each fracture. A simulation is performed using the segmented complex well model.

Figure 8:
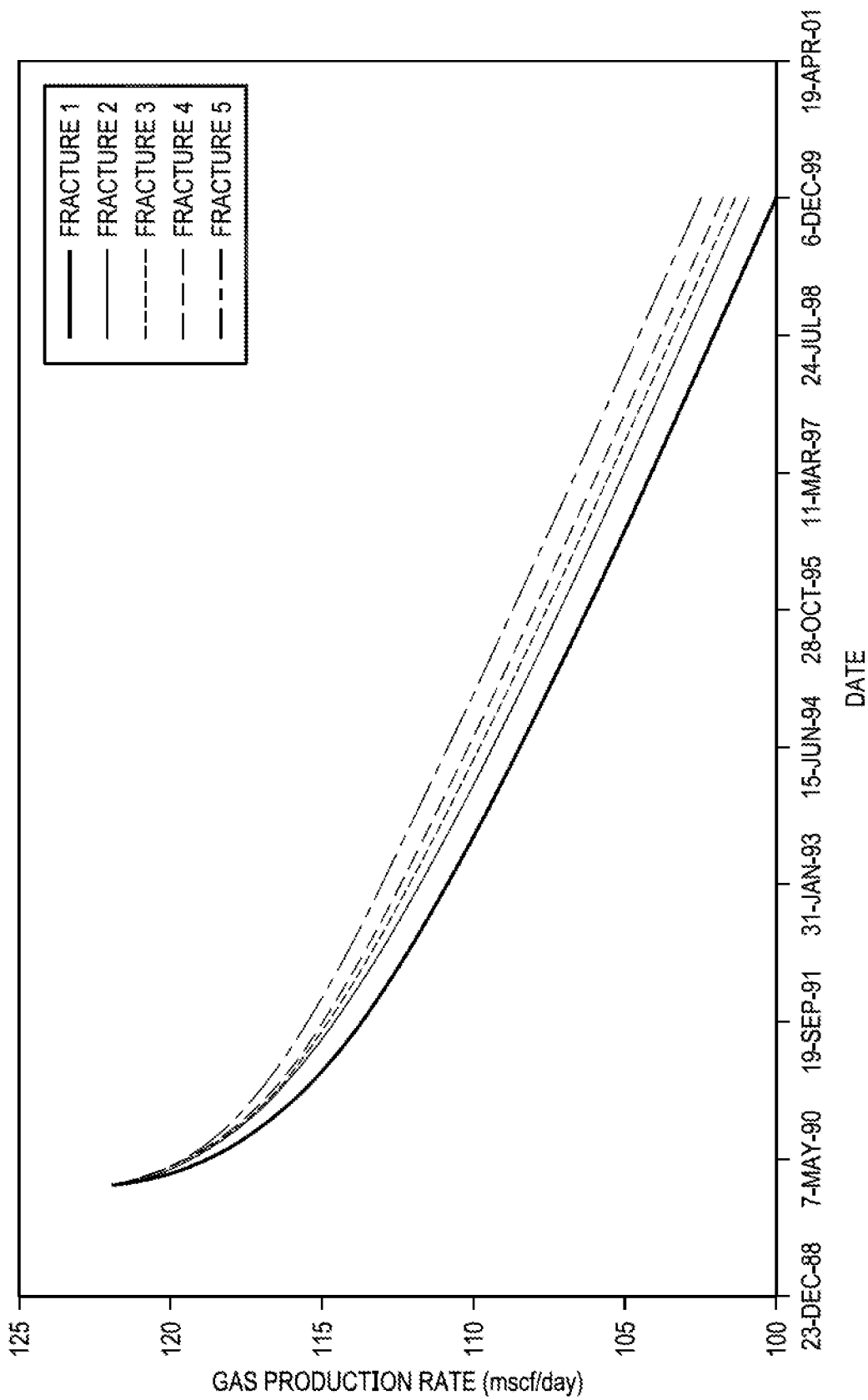

FIGS. 8-10 illustrate simulation results of the first simulation. In some embodiments, the simulation results include respective fracture production information for each fracture. FIG. 8 illustrates the individual fracture performances for the first simulation. Additionally, the simulation results include detailed results for each fracture. The detailed results for a fracture include the results corresponding to one or more segments that represent the fracture. FIG. 9A, FIG. 9B, FIG. 9C, FIG. 9D, and FIG. 9E illustrate the detailed results for fractures 1, 2, 3, 4, 5, respectively. Each figure illustrates the production profile for a fracture over different time periods, where the production profile is the performance of one wing section of the fracture versus measured depth. The performance can be measured in gas rate in thousand standard cubic feet per day (Mscf/day). As shown in this figures, there is very little production away from the motherbore and the highest performance is in sections closest to the motherbore.

Furthermore, the simulation results at the fracture level include details related to the pressure profile of the fractures. FIG. 10 illustrates a pressure profile along fracture 1. The x-axis is a measured depth in feet or meters, and the y-axis is fracture pressure in psi. The pressure profile shows the wellbore pressure away from the motherbore at the end of the fracture wings and at the intersection between the fractures and the motherbore. The lowest pressure point explains why the production for each fracture is showing the highest value at the intersection between fracture and the motherbore since the wellbore pressure has the lowest value, which results in the highest drawdown pressure, and therefore, more gas influx at these segments.

Figure 12:
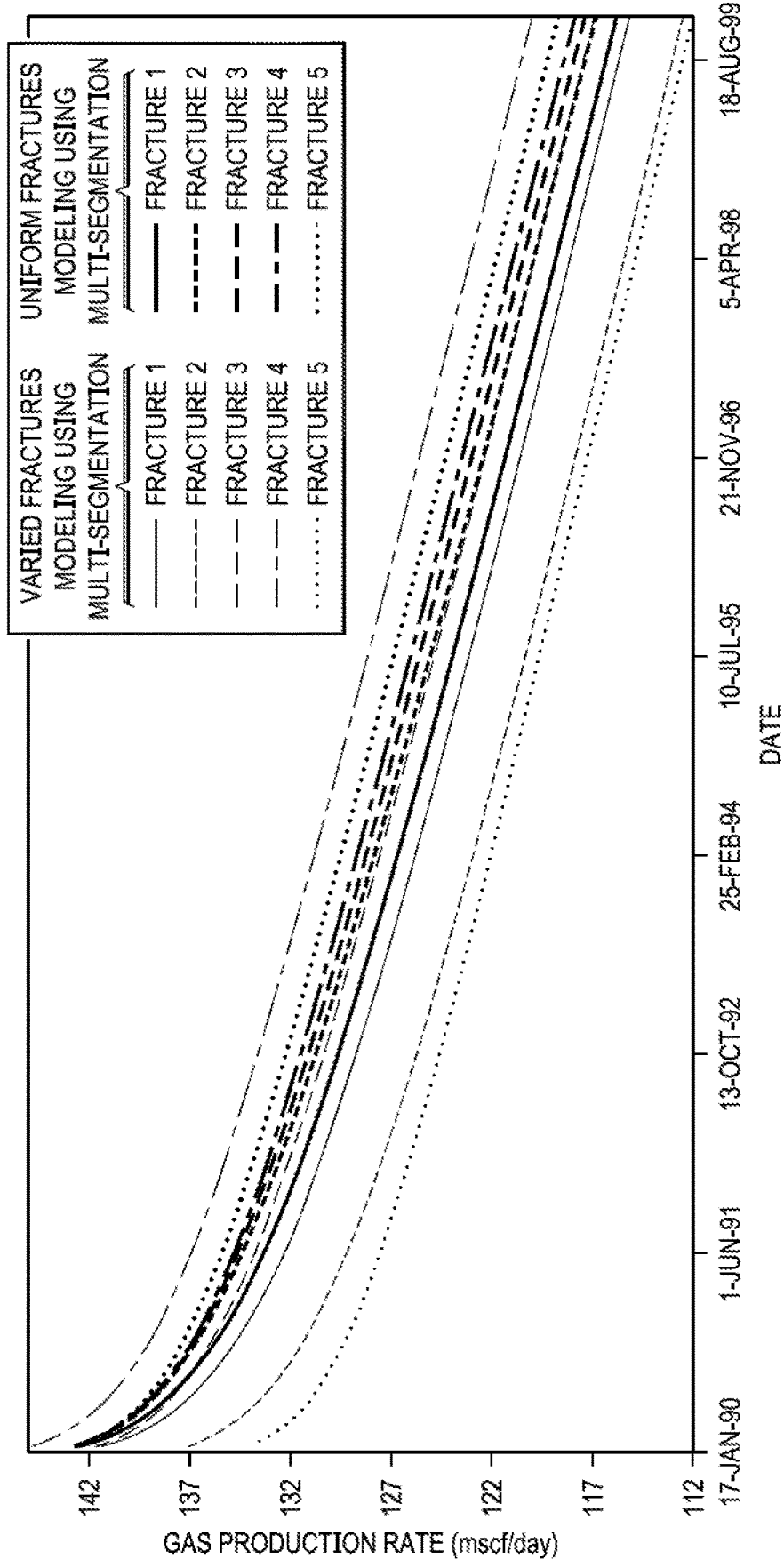

Turning to FIGS. 11-12, these figures illustrate the simulation results of the second simulation. In the second simulation, the properties of the five fractures are varied such that each fracture has different fracture half ($X_f$) length, fracture width ($W_f$), and fracture height ($h_f$). Table 4 includes a summary of the different geometries used for the fractures. Note that Equation (1) is used to calculate the equivalent diameters for the fractures.

TABLE 3

| Hydraulic Fracture Attributes of Simulation 1 | | | | |
|---|---|---|---|---|
| Fracture No. | $X_f$ (ft) | $h_f$ (ft) | $W_f$ (in) | $d_{eqv}$ (ft) |
| 1 | 229.5 | 100 | 1.29 | 0.214949658 |
| 2 | 231.92 | 96 | 1.36 | 0.226611297 |
| 3 | 177.11 | 98 | 1.48 | 0.246580811 |
| 4 | 180.72 | 100 | 1.5 | 0.24991357 |
| 5 | 230.04 | 94 | 1.36 | 0.226610845 |

FIG. 11 illustrates a comparison for total well gas production rate when using uniform fractures (as in the first simulation) with the different fracture geometry case. This comparison establishes a base line to evaluate how different fracture properties impact production performance for the gas production well. FIG. 12 illustrates a breakdown of each fracture performance in the second simulation. More specifically, FIG. 12 illustrates how the varied geometries for the fractures played a role in producing more gas in some fractures (for example, fracture 4) and less gas in other fractures (for example, fractures 1, 2, 3 and 5) compared to the uniform fracture geometry simulation. The solid line for the case with uniform fracture geometry while the dashed lines for varied fracture geometry. This detailed look into individual fracture performance is not possible using existing simulation methods since they do not accommodate completion level details to be visualized individually for each fracture.

FIG. 13 is a block diagram of an example computer system 1300 used to provide computational functionalities associated with described algorithms, methods, functions, processes, flows, and procedures described in the present disclosure, according to some implementations of the present disclosure. The illustrated computer 1302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1302 can include input devices such as keypads, keyboards, and touch screens that can accept user information. Also, the computer 1302 can include output devices that can convey information associated with the operation of the computer 1302. The information can include digital data, visual data, audio information, or a combination of information. The information can be presented in a graphical user interface (UI) (or GUI).

The computer 1302 can serve in a role as a client, a network component, a server, a database, a persistency, or components of a computer system for performing the subject matter described in the present disclosure. The illustrated computer 1302 is communicably coupled with a network 1330. In some implementations, one or more components of the computer 1302 can be configured to operate within different environments, including cloud-computing-based environments, local environments, global environments, and combinations of environments.

At a high level, the computer 1302 is an electronic computing device operable to receive, transmit, process, store, and manage data and information associated with the described subject matter. According to some implementations, the computer 1302 can also include, or be communicably coupled with, an application server, an email server, a web server, a caching server, a streaming data server, or a combination of servers.

The computer 1302 can receive requests over network 1330 from a client application (for example, executing on another computer 1302). The computer 1302 can respond to the received requests by processing the received requests using software applications. Requests can also be sent to the computer 1302 from internal users (for example, from a command console), external (or third) parties, automated applications, entities, individuals, systems, and computers.

Each of the components of the computer 1302 can communicate using a system bus 1303. In some implementations, any or all of the components of the computer 1302, including hardware or software components, can interface with each other or the interface 1304 (or a combination of both), over the system bus 1303. Interfaces can use an application programming interface (API) 1312, a service layer 1313, or a combination of the API 1312 and service layer 1313. The API 1312 can include specifications for routines, data structures, and object classes. The API 1312 can be either computer-language independent or dependent. The API 1312 can refer to a complete interface, a single function, or a set of APIs.

The service layer 1313 can provide software services to the computer 1302 and other components (whether illustrated or not) that are communicably coupled to the computer 1302. The functionality of the computer 1302 can be accessible for all service consumers using this service layer. Software services, such as those provided by the service layer 1313, can provide reusable, defined functionalities through a defined interface. For example, the interface can be software written in JAVA, C++, or a language providing data in extensible markup language (XML) format. While illustrated as an integrated component of the computer 1302, in alternative implementations, the API 1312 or the service layer 1313 can be stand-alone components in relation to other components of the computer 1302 and other components communicably coupled to the computer 1302. Moreover, any or all parts of the API 1312 or the service layer 1313 can be implemented as child or sub-modules of another software module, enterprise application, or hardware module without departing from the scope of the present disclosure.

The computer 1302 includes an interface 1304. Although illustrated as a single interface 1304 in FIG. 13, two or more interfaces 1304 can be used according to particular needs, desires, or particular implementations of the computer 1302 and the described functionality. The interface 1304 can be used by the computer 1302 for communicating with other systems that are connected to the network 1330 (whether illustrated or not) in a distributed environment. Generally, the interface 1304 can include, or be implemented using, logic encoded in software or hardware (or a combination of software and hardware) operable to communicate with the network 1330. More specifically, the interface 1304 can include software supporting one or more communication protocols associated with communications. As such, the network 1330 or the interface's hardware can be operable to communicate physical signals within and outside of the illustrated computer 1302.

The computer 1302 includes a processor 1305. Although illustrated as a single processor 1305 in FIG. 13, two or more processors 1305 can be used according to particular needs, desires, or particular implementations of the computer 1302 and the described functionality. Generally, the processor 1305 can execute instructions and can manipulate data to perform the operations of the computer 1302, including operations using algorithms, methods, functions, processes, flows, and procedures as described in the present disclosure.

The computer 1302 also includes a database 1306 that can hold data for the computer 1302 and other components connected to the network 1330 (whether illustrated or not). For example, database 1306 can be an in-memory, conventional, or a database storing data consistent with the present disclosure. In some implementations, database 1306 can be a combination of two or more different database types (for example, hybrid in-memory and conventional databases) according to particular needs, desires, or particular implementations of the computer 1302 and the described functionality. Although illustrated as a single database 1306 in FIG. 13, two or more databases (of the same, different, or combination of types) can be used according to particular needs, desires, or particular implementations of the computer 1302 and the described functionality. While database 1306 is illustrated as an internal component of the computer 1302, in alternative implementations, database 1306 can be external to the computer 1302.

The computer 1302 also includes a memory 13013 that can hold data for the computer 1302 or a combination of components connected to the network 1330 (whether illustrated or not). Memory 1307 can store any data consistent with the present disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307 in FIG. 13, two or more memories 1307 (of the same, different, or combination of types) can be used according to particular needs, desires, or particular implementations of the computer 1302 and the described functionality. While memory 1307 is illustrated as an internal component of the computer 1302, in alternative implementations, memory 1307 can be external to the computer 1302.

The application 1308 can be an algorithmic software engine providing functionality according to particular needs, desires, or particular implementations of the computer 1302 and the described functionality. For example, application 1308 can serve as one or more components, modules, or applications. Further, although illustrated as a single application 1308, the application 1308 can be implemented as multiple applications 1308 on the computer 1302. In addition, although illustrated as internal to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion and management circuits, including recharging, standby, and power management functionalities. In some implementations, the power-supply 1314 can include a power plug to allow the computer 1302 to be plugged into a wall socket or a power source to, for example, power the computer 1302 or recharge a rechargeable battery.

There can be any number of computers 1302 associated with, or external to, a computer system containing computer 1302, with each computer 1302 communicating over network 1330. Further, the terms "client," "user," and other appropriate terminology can be used interchangeably, as appropriate, without departing from the scope of the present disclosure. Moreover, the present disclosure contemplates that many users can use one computer 1302 and one user can use multiple computers 1302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD±R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

Figure 14:
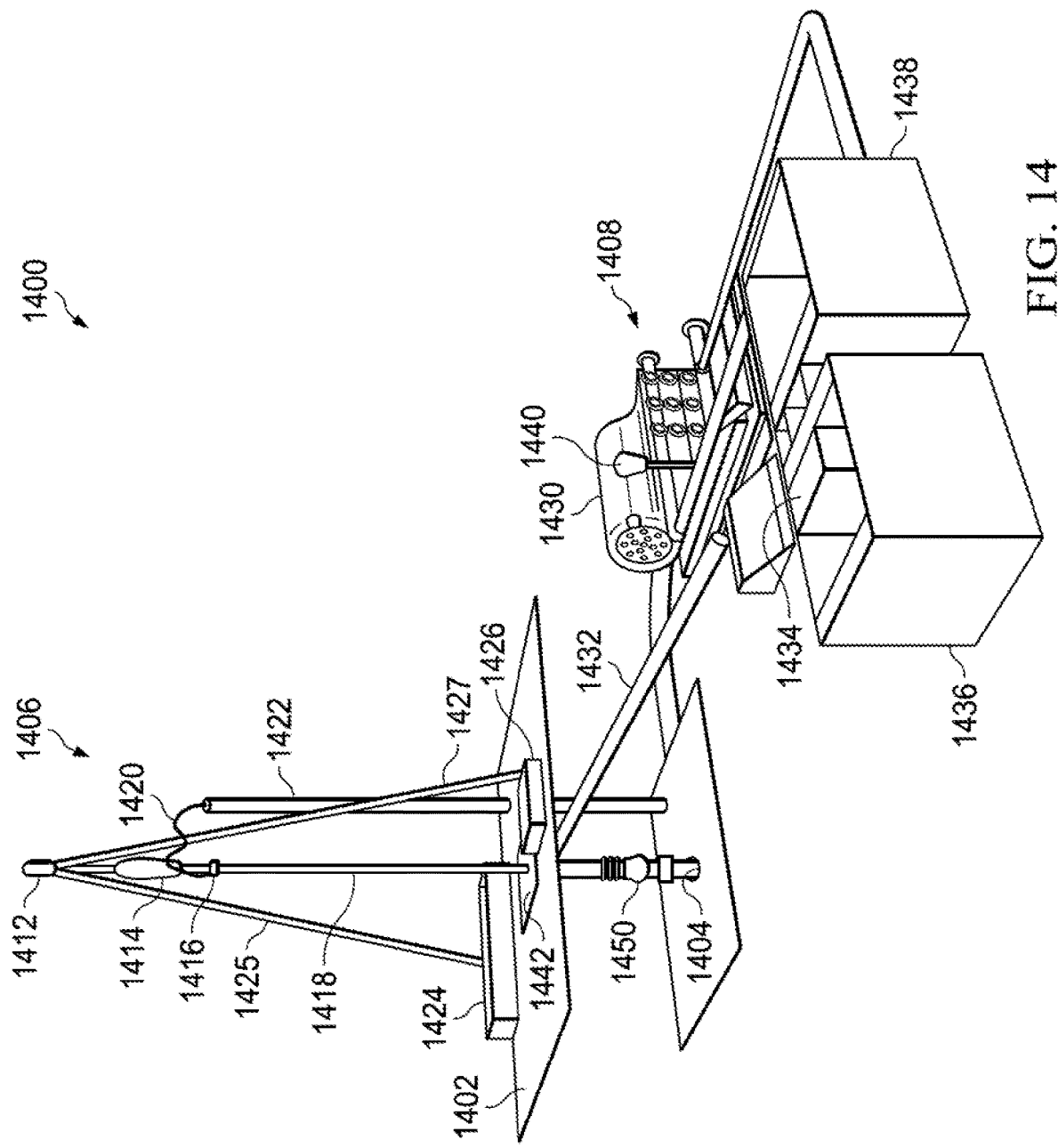
FIG. 14 illustrates a partial schematic perspective view of an example rig system for drilling and producing a well, according to some implementations of the present disclosure.

FIG. 14 is a partial schematic perspective view of an example rig system 100 for drilling and producing a well. The well can extend from the surface through the Earth to one or more subterranean zones of interest. The example rig system 1400 includes a drill floor 1402 positioned above the surface, a wellhead 1404, a drill string assembly 1406 supported by the rig structure, and a fluid circulation system 1408 to filter used drilling fluid from the wellbore and provide clean drilling fluid to the drill string assembly 1406. For example, the example rig system 1400 of FIG. 14 is shown as a drill rig capable of performing a drilling operation with the rig system 1400 supporting the drill string assembly 1406 over a wellbore. The wellhead 1404 can be used to support casing or other well components or equipment into the wellbore of the well.

The derrick or mast is a support framework mounted on the drill floor 1402 and positioned over the wellbore to support the components of the drill string assembly 1406 during drilling operations. A crown block 1412 forms a longitudinally-fixed top of the derrick, and connects to a travelling block 1414 with a drilling line including a set of wire ropes or cables. The crown block 1412 and the travelling block 1414 support the drill string assembly 1406 via a swivel 1416, a kelly 1418, or a top drive system (not shown). Longitudinal movement of the travelling block 1414 relative to the crown block 1412 of the drill string assembly 1406 acts to move the drill string assembly 1406 longitudinally upward and downward. The swivel 1416, connected to and hung by the travelling block 1414 and a rotary hook, allows free rotation of the drill string assembly 1406 and provides a connection to a kelly hose 1420, which is a hose that flows drilling fluid from a drilling fluid supply of the circulation system 1408 to the drill string assembly 1406. A standpipe 1422 mounted on the drill floor 1402 guides at least a portion of the kelly hose 1420 to a location proximate to the drill string assembly 1406. The kelly 1418 is a hexagonal device suspended from the swivel 1416 and connected to a longitudinal top of the drill string assembly 1406, and the kelly 1418 turns with the drill string assembly 1406 as the rotary table 1442 of the drill string assembly turns.

In the example rig system 1400 of FIG. 14, the drill string assembly 1406 is made up of drill pipes with a drill bit (not shown) at a longitudinally bottom end of the drill string. The drill pipe can include hollow steel piping, and the drill bit can include cutting tools, such as blades, discs, rollers, cutters, or a combination of these, to cut into the formation and form the wellbore. The drill bit rotates and penetrates through rock formations below the surface under the combined effect of axial load and rotation of the drill string assembly 1406. In some implementations, the kelly 1418 and swivel 1416 can be replaced by a top drive that allows the drill string assembly 1406 to spin and drill. The wellhead assembly 1404 can also include a drawworks 1424 and a deadline anchor 1426, where the drawworks 1424 includes a winch that acts as a hoisting system to reel the drilling line in and out to raise and lower the drill string assembly 1406 by a fast line 1425. The deadline anchor 1426 fixes the drilling line opposite the drawworks 1424 by a deadline 1427, and can measure the suspended load (or hook load) on the rotary hook. The weight on bit (WOB) can be measured when the drill bit is at the bottom the wellbore. The wellhead assembly 1404 also includes a blowout preventer 1450 positioned at the surface of the well and below (but often connected to) the drill floor 1402. The blowout preventer 1450 acts to prevent well blowouts caused by formation fluid entering the wellbore, displacing drilling fluid, and flowing to the surface at a pressure greater than atmospheric pressure. The blowout preventer 1450 can close around (and in some instances, through) the drill string assembly 1406 and seal off the space between the drill string and the wellbore wall. The blowout preventer 1450 is described in more detail later.

During a drilling operation of the well, the circulation system 1408 circulates drilling fluid from the wellbore to the drill string assembly 1406, filters used drilling fluid from the wellbore, and provides clean drilling fluid to the drill string assembly 1406. The example circulation system 1408 includes a fluid pump 1430 that fluidly connects to and provides drilling fluid to drill string assembly 1406 via the kelly hose 1420 and the standpipe 1422. The circulation system 1408 also includes a flow-out line 1432, a shale shaker 1434, a settling pit 1436, and a suction pit 1438. In a drilling operation, the circulation system 1408 pumps drilling fluid from the surface, through the drill string assembly 1406, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluids to go into the formation. Apart from well control, drilling fluids can also cool the drill bit and lift rock cuttings from the drilled formation up the annulus and to the surface to be filtered out and treated before it is pumped down the drill string assembly 1406 again. The drilling fluid returns in the annulus with rock cuttings and flows out to the flow-out line 1432, which connects to and provides the fluid to the shale shaker 1434. The flow line is an inclined pipe that directs the drilling fluid from the annulus to the shale shaker 1434. The shale shaker 1434 includes a mesh-like surface to separate the coarse rock cuttings from the drilling fluid, and finer rock cuttings and drilling fluid then go through the settling pit 1436 to the suction pit 1436. The circulation system 1408 includes a mud hopper 1440 into which materials (for example, to provide dispersion, rapid hydration, and uniform mixing) can be introduced to the circulation system 1408. The fluid pump 1430 cycles the drilling fluid up the standpipe 1422 through the swivel 1416 and back into the drill string assembly 1406 to go back into the well.

The example wellhead assembly 1404 can take a variety of forms and include a number of different components. For example, the wellhead assembly 1404 can include additional or different components than the example shown in FIG. 14. Similarly, the circulation system 1408 can include additional or different components than the example shown in FIG. 14.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. Accordingly, other embodiments are within the scope of the following claims.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

What is claimed is:

1. A computer-implemented method for simulating performance of a fractured well, the method comprising:
   receiving, by a computing device, parameters of the fractured well, wherein the fractured well comprises a wellbore and one or more hydraulic fractures extending from the wellbore;
   generating, by the computing device and based on the parameters of the fractured well, an equivalent complex well that represents the fractured well;
   executing, by the computing device and using the equivalent complex well, a simulation that simulates the performance of the fractured well;
   determining, based on a simulated performance of the fractured well, a hydraulic fracture design of a well to be drilled, wherein the hydraulic fracture design specifies a hydraulic fracture spacing intensity; and
   controlling, by the computing device and based on the hydraulic fracture design, at least one drilling device to drill the well according to the hydraulic fracture design such that adjacent fractures in the drilled well maintain a distance that is no less than the hydraulic fracture spacing intensity,
   wherein generating, by the computing device and based on the parameters of the fractured well, the equivalent complex well comprises: modeling each hydraulic fracture by a respective rectangular tube, wherein dimensions of the respective rectangular tube is based on dimensions of the hydraulic fracture.

2. The computer-implemented method of claim 1, wherein the equivalent complex well is a multilateral well that includes a motherbore and one or more lateral wellbores, wherein the motherbore represents the wellbore of the fractured well, and wherein each lateral wellbore represents a respective hydraulic fracture.

3. The computer-implemented method of claim 1, wherein the parameters of the fractured well comprise at least one of: (i) a length of the wellbore, (ii) respective fracture half-lengths ($X_f$) of the one or more hydraulic fractures, (iii) respective fracture heights ($h_f$) of the one or more hydraulic fractures, (iv) respective fracture widths ($W_f$) of the one or more hydraulic fractures, or (v) the hydraulic fracture spacing intensity.

4. The computer-implemented method of claim 1, wherein generating, by the computing device and based on the parameters of the fractured well, the equivalent complex well further comprises:
   generating a motherbore of the equivalent complex well to represent the wellbore of the fractured well.

5. The computer-implemented method of claim 1, wherein generating, by the computing device and based on the parameters of the fractured well, the equivalent complex well further comprises:
   converting the respective rectangular tube into a respective wellbore, wherein the respective wellbore has an equivalent wellbore diameter calculated based on the dimensions of the respective rectangular tube, and wherein a length of the respective wellbore is equal to a height of the respective rectangular tube.

6. The computer-implemented method of claim 1, wherein executing, by the computing device and using the equivalent complex well, the simulation comprises:
   generating, using a multi-segmentation approach, a model of the equivalent complex well, wherein the model comprises one or more respective segments for at least one of the wellbore or the one or more hydraulic fractures.

7. The computer-implemented method of claim 6, wherein executing, by the computing device and using the equivalent complex well, the simulation further comprises:
   generating a computation matrix for the model of the equivalent complex well, wherein the wellbore computational matrix comprises a system of linear algebraic equations that represent at least one of mass balance equations, momentum balance equations, or energy balance equations for the one or more respective segments; and
   solving the computation matrix and determining that a solution to the computation matrix has converged to an acceptable tolerance.

8. The computer-implemented method of claim 1, further comprising:
   generating, based on the simulation, at least one graph that represents individual production and performance profiles for the one or more hydraulic fractures; and
   causing, by the computing device, a display device to display the at least one graph.

9. The computer-implemented method of claim 1, further comprising:
   coupling a solution of the simulation to a reservoir simulation, wherein the coupling is explicit, sequential, or implicit.

10. A non-transitory computer-readable medium storing one or more instructions executable by a computer system to perform operations for simulating performance of a fractured well, the operations comprising:
    receiving, by a computing device, parameters of the fractured well, wherein the fractured well comprises a wellbore and one or more hydraulic fractures extending from the wellbore;

generating, by the computing device and based on the parameters of the fractured well, an equivalent complex well that represents the fractured well;

executing, by the computing device and using the equivalent complex well, a simulation that simulates the performance of the fractured well;

determining, based on a simulated performance of the fractured well, a hydraulic fracture design of a well to be drilled, wherein the hydraulic fracture design specifies a hydraulic fracture spacing intensity; and controlling, by the computing device and based on the hydraulic fracture design, at least one drilling device to drill the well according to the hydraulic fracture design such that adjacent fractures in the drilled well maintain a distance that is no less than the hydraulic fracture spacing intensity, wherein generating, by the computing device and based on the parameters of the fractured well, the equivalent complex well comprises: modeling each hydraulic fracture by a respective rectangular tube, wherein dimensions of the respective rectangular tube is based on dimensions of the hydraulic fracture.

11. The non-transitory computer-readable medium of claim 10, wherein the equivalent complex well is a multilateral well that includes a motherbore and one or more lateral wellbores, wherein the motherbore represents the wellbore of the fractured well, and wherein each lateral wellbore represents a respective hydraulic fracture.

12. The non-transitory computer-readable medium of claim 10, wherein the parameters of the fractured well comprise at least one of: (i) a length of the wellbore, (ii) respective fracture half-lengths ($X_f$) of the one or more hydraulic fractures, (iii) respective fracture heights ($h_f$) of the one or more hydraulic fractures, (iv) respective fracture widths ($W_f$) of the one or more hydraulic fractures, or (v) hydraulic fracture spacing intensity.

13. The non-transitory computer-readable medium of claim 10, wherein generating, by the computing device and based on the parameters of the fractured well, the equivalent complex well further comprises:

generating a motherbore of the equivalent complex well to represent the wellbore of the fractured well.

14. The non-transitory computer-readable medium of claim 10, wherein generating, by the computing device and based on the parameters of the fractured well, the equivalent complex well further comprises:

converting the respective rectangular tube into a respective wellbore, wherein the respective wellbore has an equivalent wellbore diameter calculated based on the dimensions of the respective rectangular tube, and wherein a length of the respective wellbore is equal to a height of the respective rectangular tube.

15. A system for simulating performance of a fractured well, the system comprising:

one or more processors; and a non-transitory computer-readable storage medium coupled to the one or more processors and storing programming instructions for execution by the one or more processors, the programming instructions instructing the one or more processors to perform operations comprising:

receiving, by a computing device, parameters of the fractured well, wherein the fractured well comprises a wellbore and one or more hydraulic fractures extending from the wellbore;

generating, by the computing device and based on the parameters of the fractured well, an equivalent complex well that represents the fractured well;

executing, by the computing device and using the equivalent complex well, a simulation that simulates the performance of the fractured well;

determining, based on a simulated performance of the fractured well, a hydraulic fracture design of a well to be drilled, wherein the hydraulic fracture design specifies a hydraulic fracture spacing intensity; and controlling, by the computing device and based on the hydraulic fracture design, at least one drilling device to drill the well according to the hydraulic fracture design such that adjacent fractures in the drilled well maintain a distance that is no less than the hydraulic fracture spacing intensity, wherein generating, by the computing device and based on the parameters of the fractured well, the equivalent complex well comprises: modeling each hydraulic fracture by a respective rectangular tube, wherein dimensions of the respective rectangular tube is based on dimensions of the hydraulic fracture.

16. The system of claim 15, wherein the equivalent complex well is a multilateral well that includes a motherbore and one or more lateral wellbores, wherein the motherbore represents the wellbore of the fractured well, and wherein each lateral wellbore represents a respective hydraulic fracture.

17. The system of claim 15, wherein the parameters of the fractured well comprise at least one of: (i) a length of the wellbore, (ii) respective fracture half-lengths ($X_f$) of the one or more hydraulic fractures, (iii) respective fracture heights ($h_f$) of the one or more hydraulic fractures, (iv) respective fracture widths ($W_f$) of the one or more hydraulic fractures, or (v) the hydraulic fracture spacing intensity.

* * * * *